Oct. 13, 1959  B. G. PRICE ET AL  2,908,085
MEASURING INSTRUMENTS

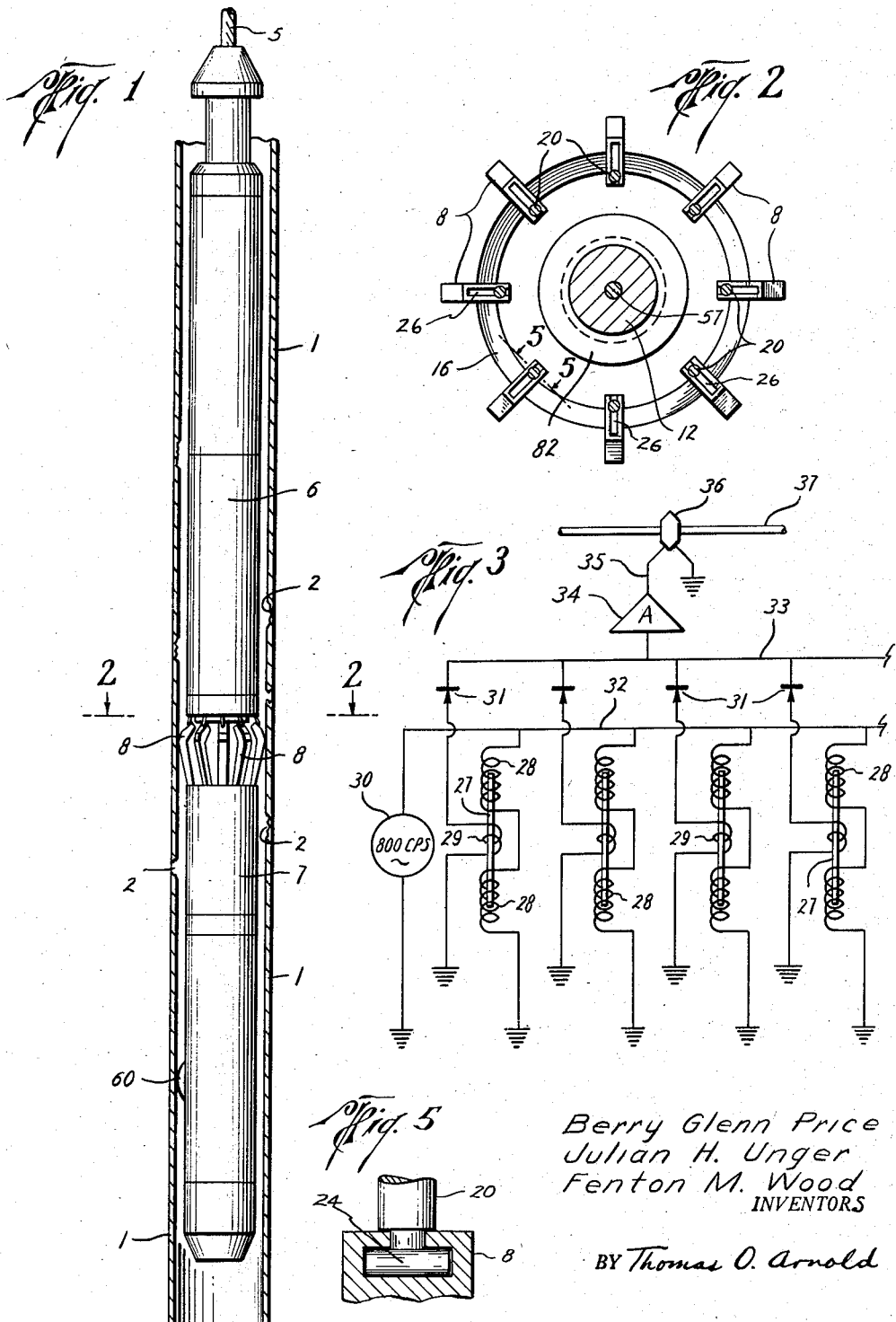

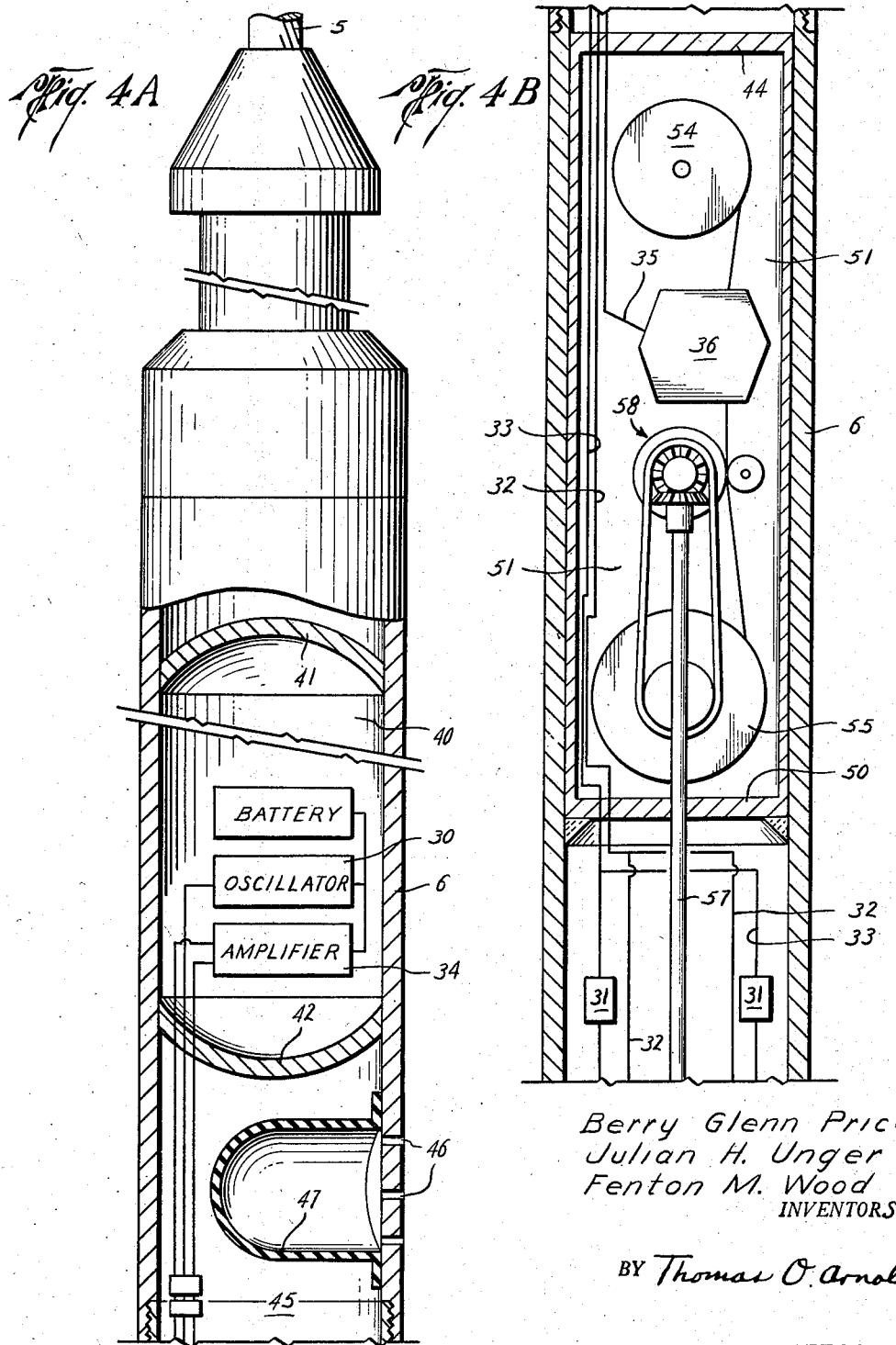

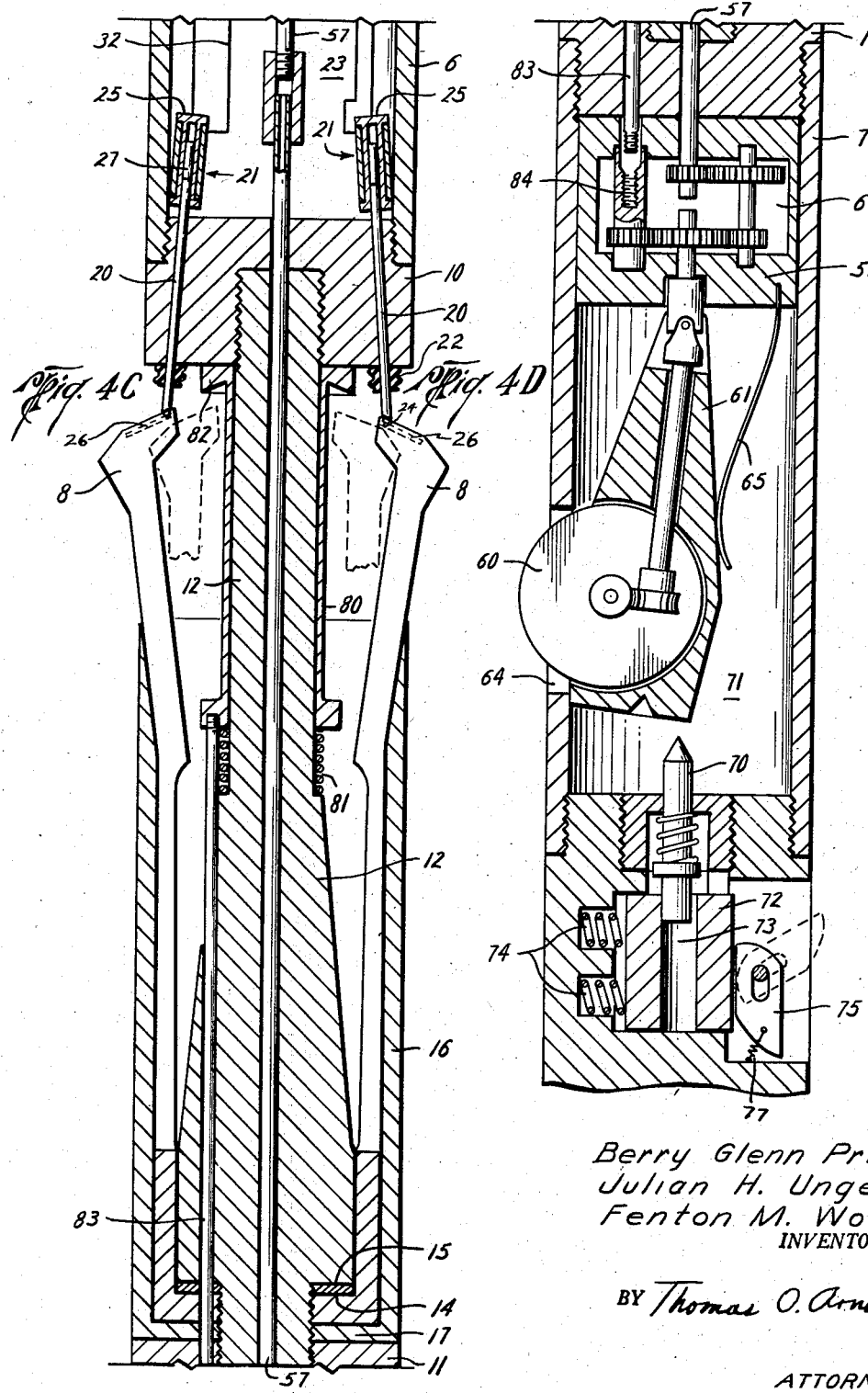

Filed Nov. 15, 1957  11 Sheets-Sheet 4

INVENTORS
BERRY GLENN PRICE
JULIAN H. UNGER
FENTON M. WOOD
BY *Thomas O. Arnold*
ATTORNEY Oct. 13, 1959    B. G. PRICE ET AL    2,908,085
MEASURING INSTRUMENTS Filed Nov. 15, 1957    11 Sheets-Sheet 5

INVENTORS
BERRY GLENN PRICE
JULIAN H. UNGER
FENTON M. WOOD

BY Thomas O. Arnold
ATTORNEY

Oct. 13, 1959 B. G. PRICE ET AL 2,908,085
MEASURING INSTRUMENTS
Filed Nov. 15, 1957 11 Sheets-Sheet 6

INVENTORS
BERRY GLENN PRICE
JULIAN H. UNGER
FENTON M. WOOD
BY Thomas O. Arnold
ATTORNEY Oct. 13, 1959 B. G. PRICE ET AL 2,908,085
MEASURING INSTRUMENTS
Filed Nov. 15, 1957 11 Sheets-Sheet 7
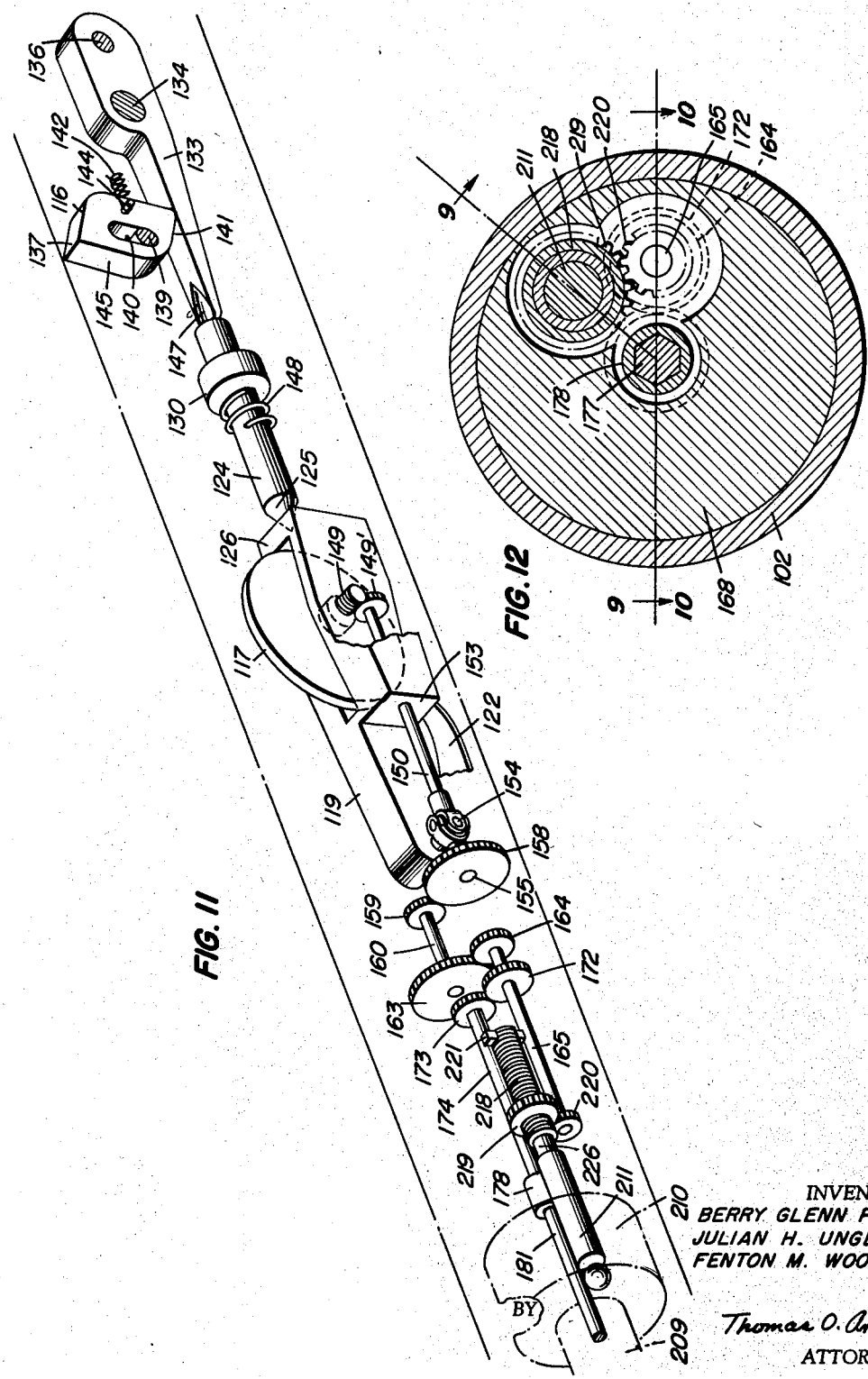
INVENTORS
BERRY GLENN PRICE
JULIAN H. UNGER
FENTON M. WOOD
BY Thomas O. Arnold
ATTORNEY

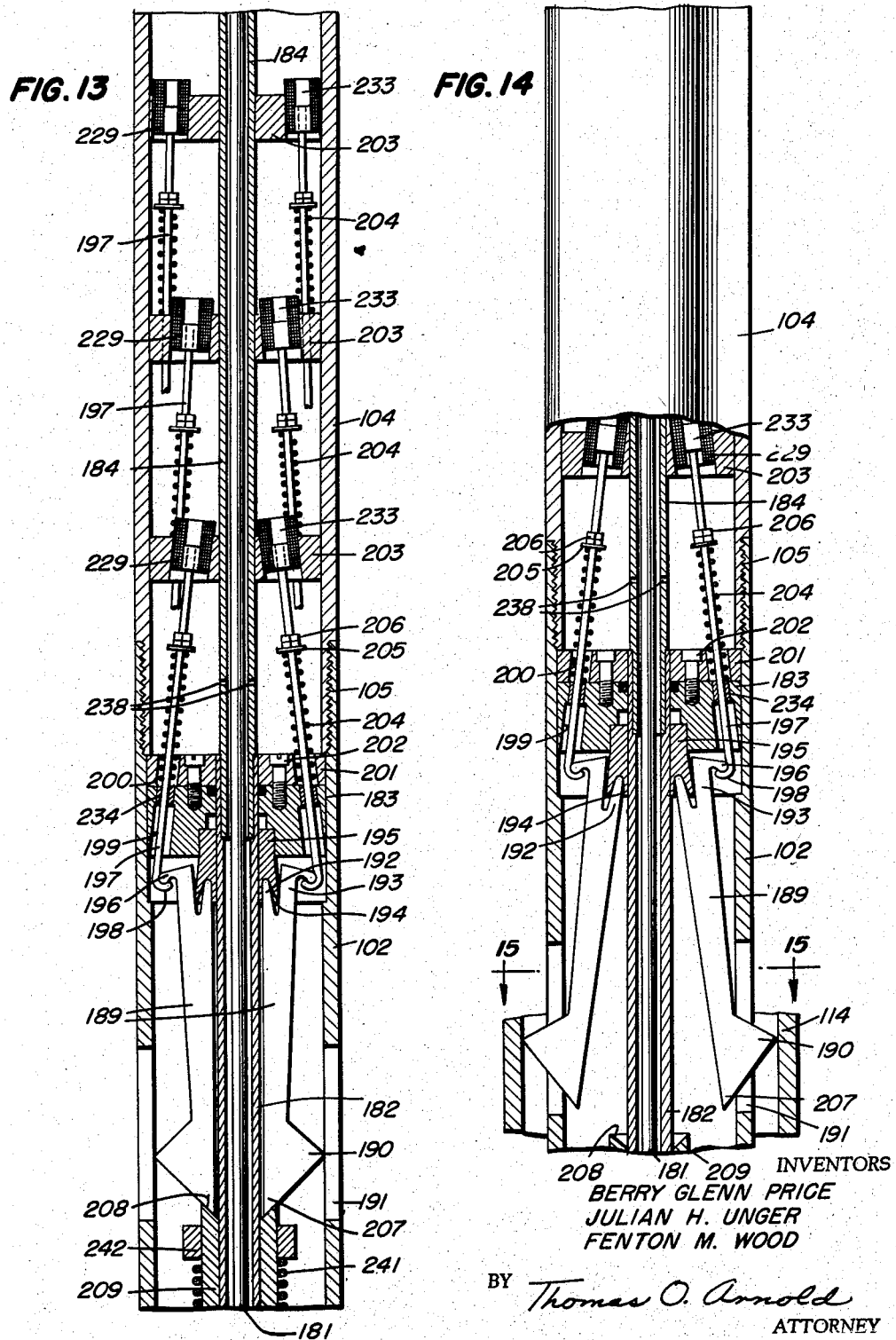

Oct. 13, 1959    B. G. PRICE ET AL    2,908,085
MEASURING INSTRUMENTS
Filed Nov. 15, 1957    11 Sheets-Sheet 9
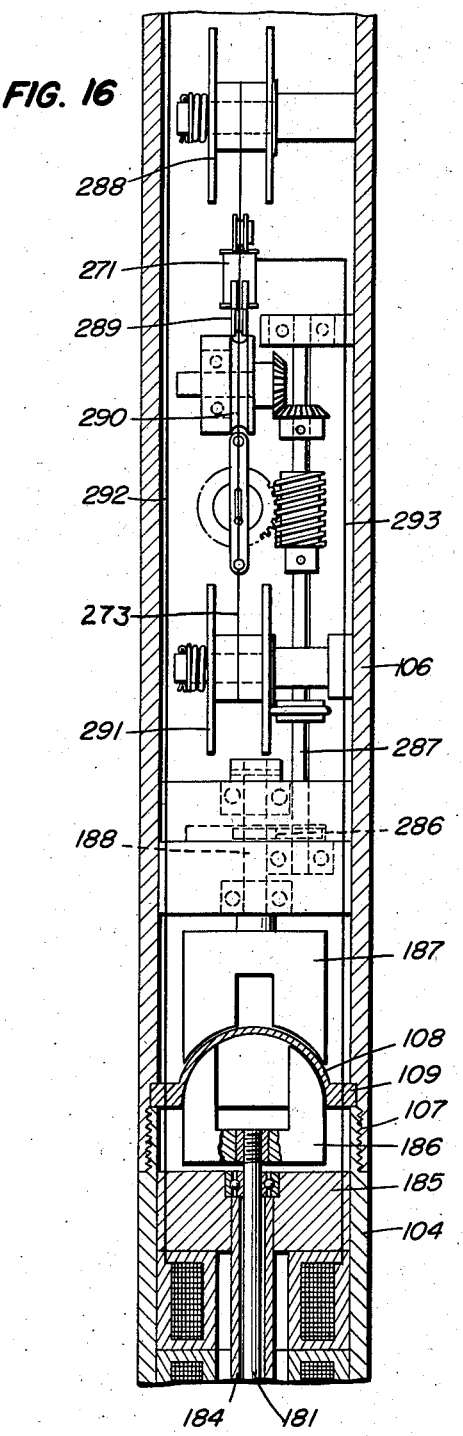
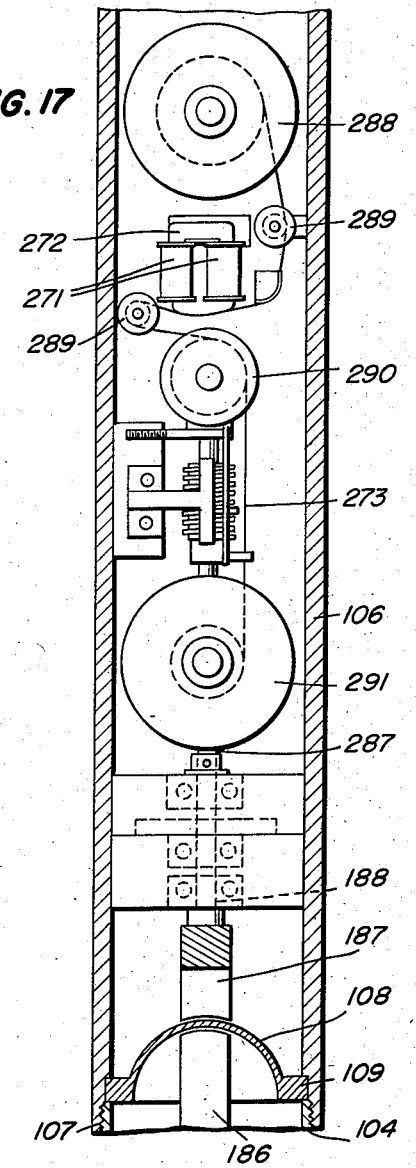
INVENTORS
BERRY GLENN PRICE
JULIAN H. UNGER
FENTON M. WOOD
BY Thomas O. Arnold
ATTORNEY

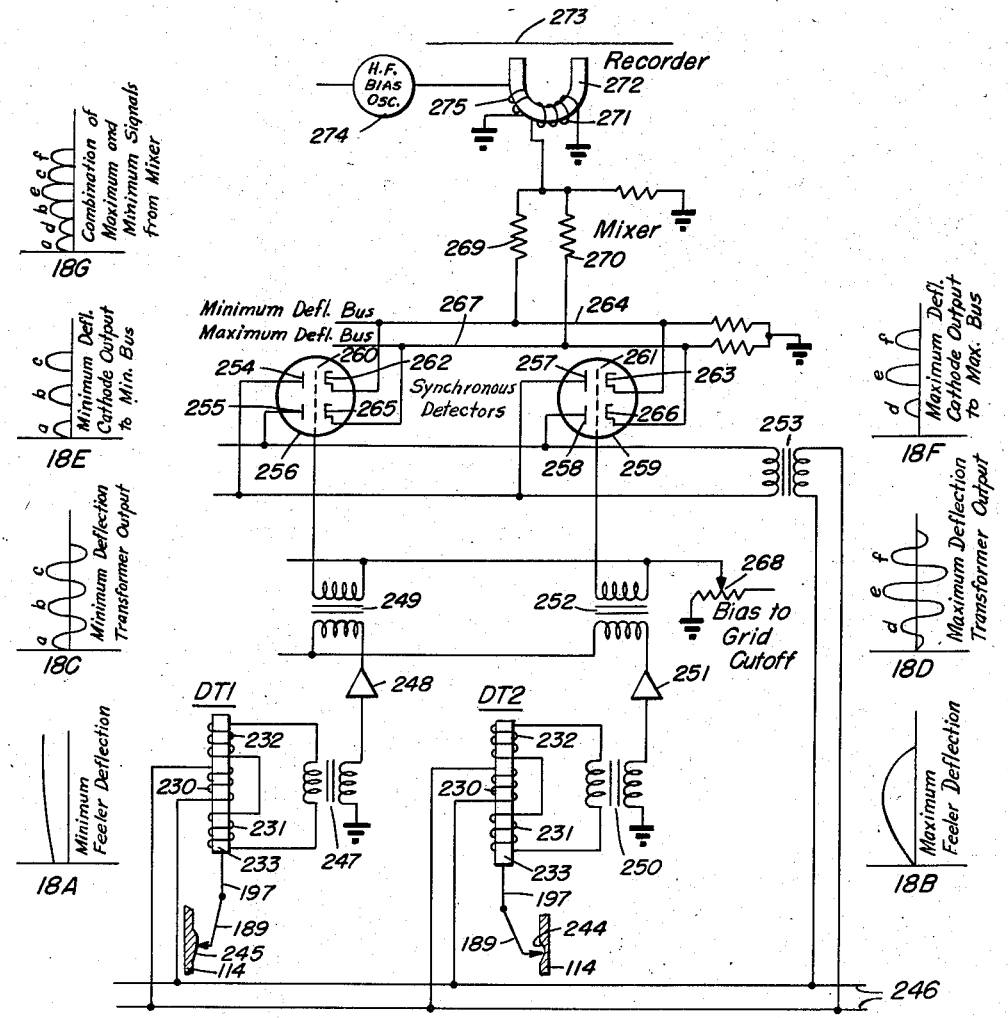

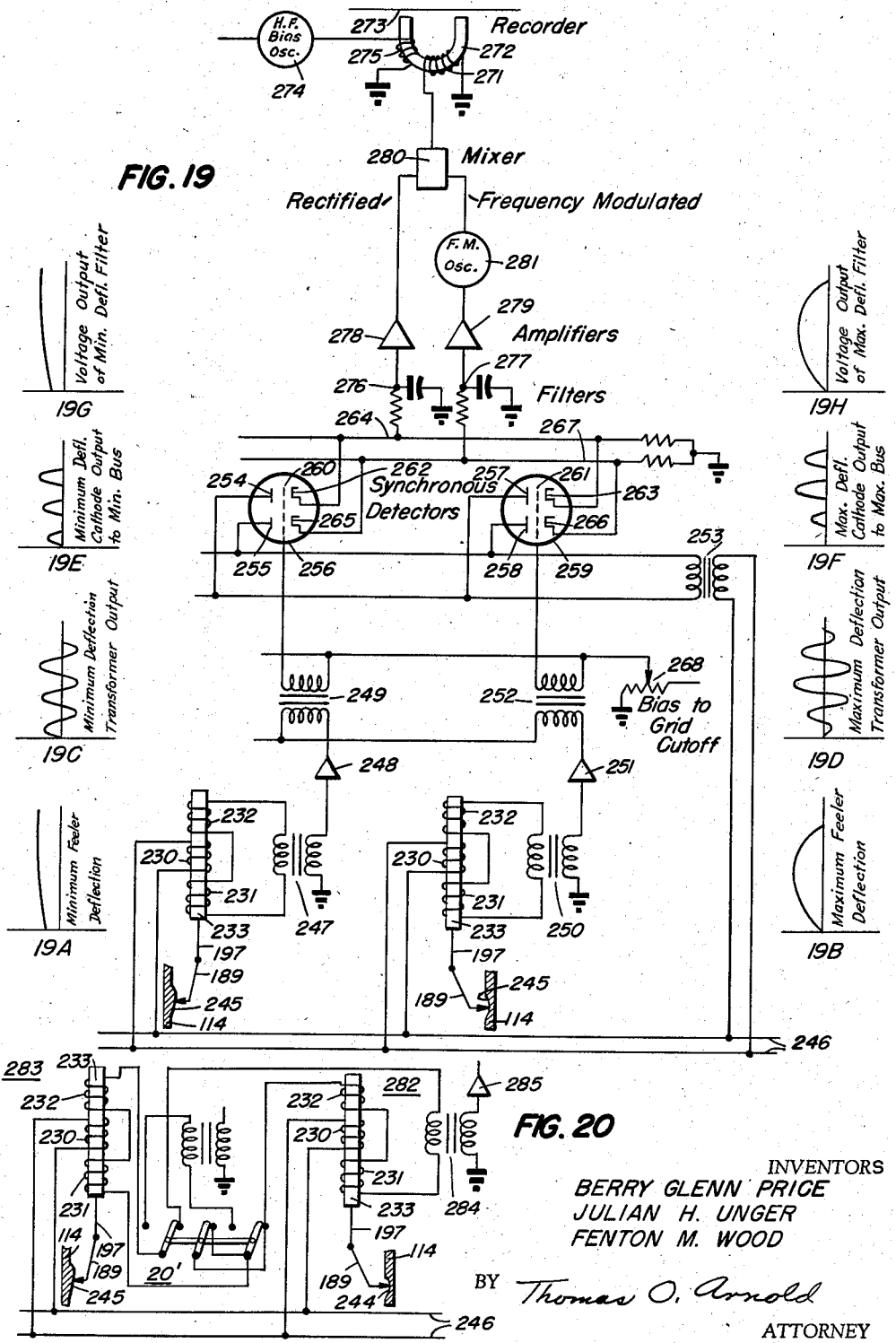

United States Patent Office 2,908,085
Patented Oct. 13, 1959

2,908,085

MEASURING INSTRUMENTS

Berry G. Price, Fenton M. Wood, and Julian H. Unger, Houston, Tex., assignors to Tuboscope Company, Harris County, Tex., a corporation of Delaware Application November 15, 1957, Serial No. 696,875

18 Claims. (Cl. 33—178)

This invention relates to measuring instruments, such as calipers, and more particularly to electro-mechanical means for measuring and recording the internal dimensions and variations in the internal surface of bodies, such as tubing, pipe, and casing used in wells for oil, gas and the like.

Pipe, such as tubing used in oil wells, sometimes becomes corroded or eroded by the passage of gas or liquid therethrough and, in some instances, may become constricted due to the formation of scale or rust on the interior thereof. In deep gas wells, for example, the tubing through which the gas flows may become weak in spots due to corrosion or erosion. The tubing may give way under the stress of pressure of fluids therein, or may part when an attempt is made to pull it.

Heretofore, various means have been devised for measuring the internal dimensions of a pipe to determine the corrosion and erosion on the internal surfaces of the pipe. These have met with varying degrees of success, but all such means suffer from one or more important deficiencies.

An object of this invention is to provide a novel and improved measuring instrument or caliper for pipe, such as production tubing and casing for oil wells.

Another object of this invention is to provide an improved electrical measuring instrument or caliper which can be operated in high pressure wells on a conventional wire line without electrical connections to the surface of a well.

A further object of this invention is to provide an improved measuring instrument or caliper for determining and recording the maximum and minimum internal diameters of a body, such as a pipe or casing.

Still another object of this invention is to provide an improved measuring instrument or caliper for determining and making a continuous record of both the maximum and minimum radius of a tube or casing.

A still further object of this invention is to provide an improved measuring instrument or caliper for determining internal dimensions and surface variations of a hollow body, such as a tube or casing, including improvements in the structural driving and latching mechanisms of the instrument, and improvements in the electrical sensing and detecting circuits.

Yet another object of this invention is to provide a measuring instrument or caliper provided with an improved electrical sensing and detecting system.

Other objects and advantages of this invention will be apparent and the invention will be better understood from the following description and accompanying drawings.

These objects are accomplished, in accordance with this invention, by the use of a generator of an alternating current signal, a group of differential transformers, potentiometers, or the like, adapted to receive such signal, a plurality of caliper feelers adapted to position or activate the cores of such transformers, a rectifier or detector connected to conduct from the secondary of each transformer to a bus-line, and means for recording the signals picked up on such bus-line. Suitable amplifiers, biases, modulators, and mixers may be provided, as may be found desirable. Various improved drive, latch, and housing details also are incorporated to provide improved and reliable operation.

This application is a continuation-in-part of application Serial No. 474,108, filed December 9, 1954, now abandoned.

In the drawings:

Fig. 1 is an elevational view of one embodiment of the invention positioned in typical pipe to be calipered;

Fig. 2 is a horizontal sectional view of one embodiment of the invention taken along line 2—2 of Fig. 1;

Fig. 3 is a schematic diagram of the electrical circuit of an embodiment of the invention;

Figure 6:
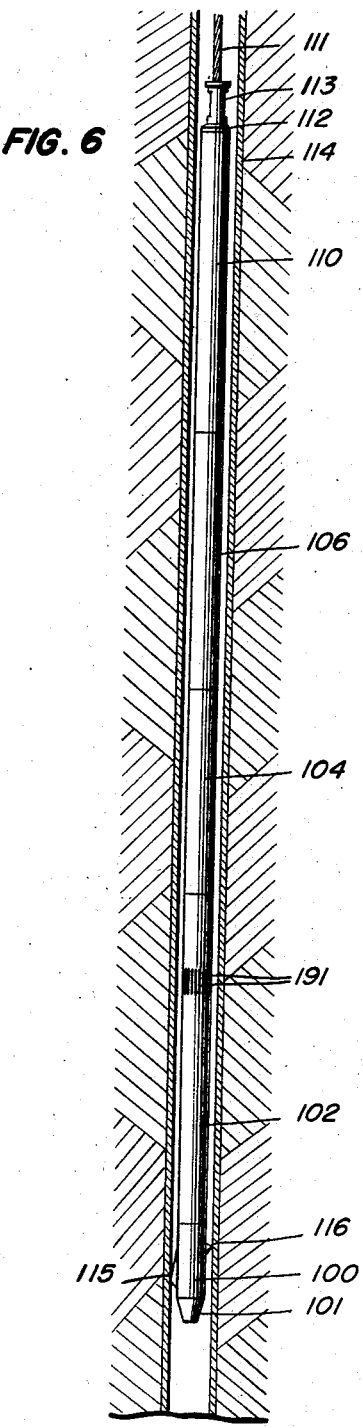
Figure 15:
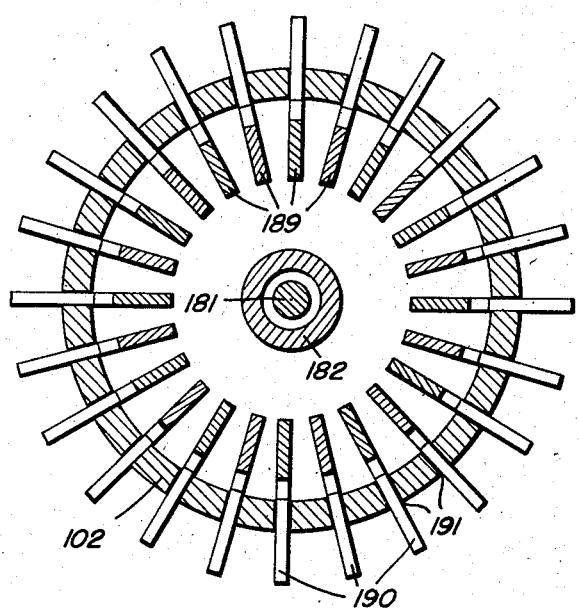
Figure 7:
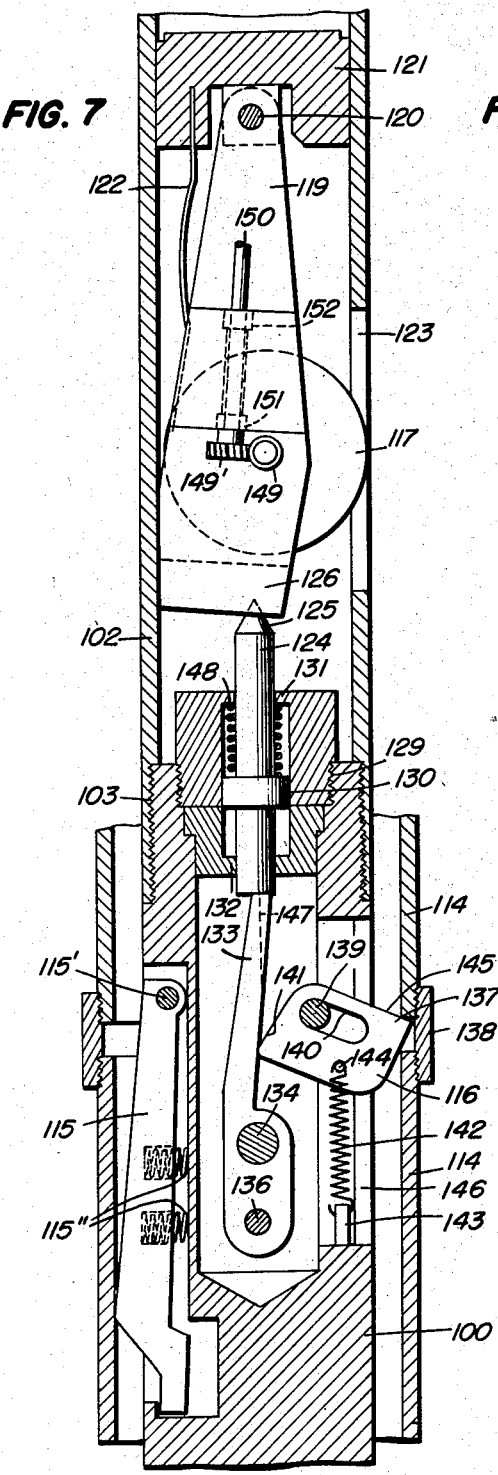
Figure 8:
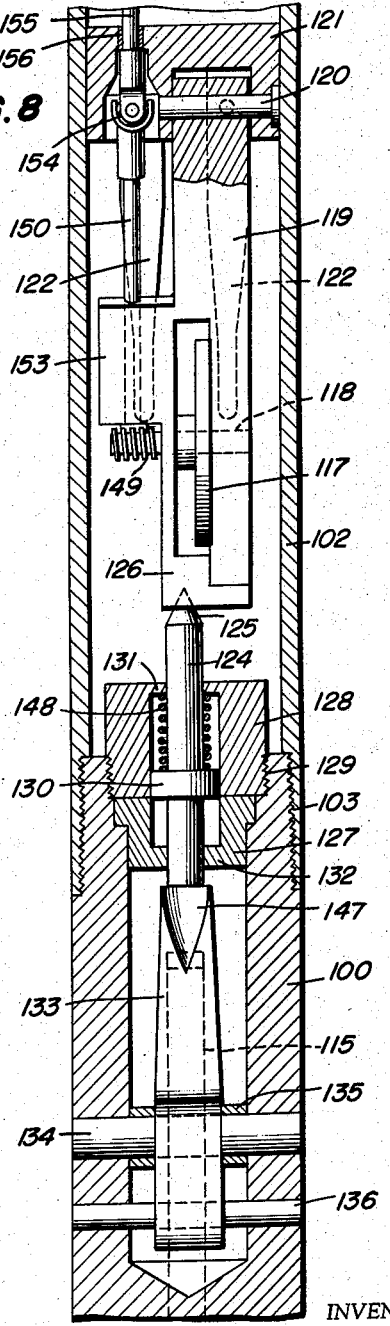
Figure 9:
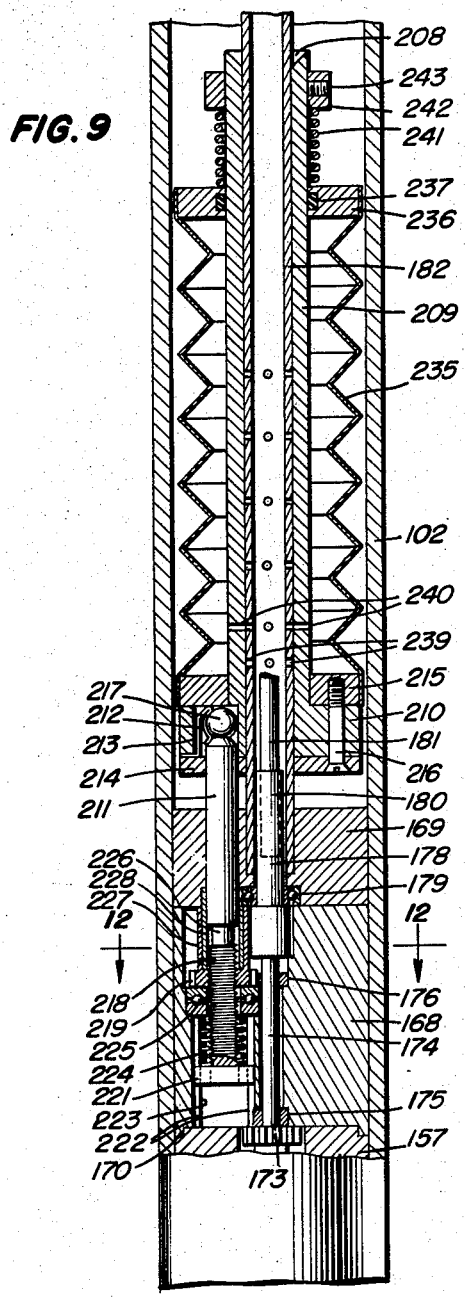
Figure 10:
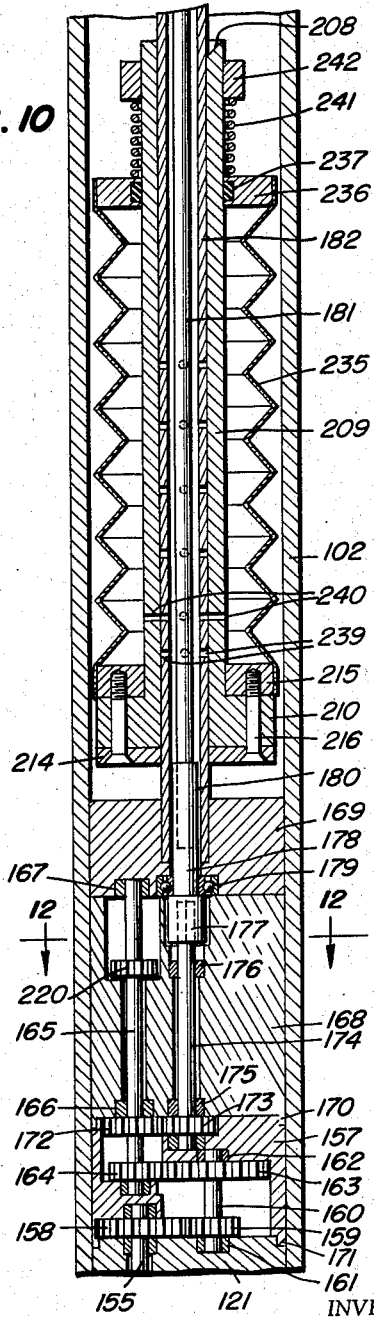

Figs. 4A, 4B, 4C, and 4D are elevational sections of an embodiment of the invention shown in Fig. 1, each detailing a different portion of the tool; Fig. 4A details the upper end of the tool; Fig. 4B details the next lower portion of the tool; Fig. 4C details the portion of the tool below that illustrated in Fig. 4B; and Fig. 4D details the remainder of the tool, being the lower end thereof;

Fig. 5 is a sectional view taken along the line 5—5 of Fig. 2, and depicting the T-in-slot connection between the feeler ends and the followers;

Fig. 6 is an elevational view of another embodiment of this invention shown with the operating parts in the position for lowering the instrument into a pipe or casing;

Fig. 7 is a longitudinal view, partly in section through the lower portion of the instrument shown in Fig. 6, illustrating details of the tripping and driving mechanism in latched position just prior to the commencement of a release of the latching mechanism by the trigger cam device;

Fig. 8 is a longitudinal view, partly in section taken at right angles to the view in Fig. 7, and illustrating the same parts of the mechanism as therein shown;

Fig. 9 is a longitudinal view, partly in section along line 9—9 of Fig. 12, of the geared drive for the recording mechanism and of the latch and release mechanism for latching the feelers in inoperative position;

Fig. 10 is a longitudinal view of the section of the instrument shown in Fig. 9, partly in section along line 10—10 of Fig. 12;

Fig. 11 is a perspective view illustrating the major latching and driving devices shown in Figs. 7–10, and showing their relative operating positions;

Fig. 12 is a cross-sectional view taken along lines 12—12 of Figs. 9 and 10;

Fig. 13 is a longitudinal sectional view, partly broken away, showing the detailed arrangement and structure of the feelers, differential transformers, and their interconnections, with the feelers latched in inoperative position in the manner in which they are positioned when the instrument is being inserted into a tube or casing;

Fig. 14 is a longitudinal view, partly in section, of the part of the instrument shown in Fig. 13, with the feeler released into operative position in engagement with the inner surface of a tube or casing;

Fig. 15 is a sectional view taken along line 15—15 of Fig. 14, showing the relative circumferential arrangement of feelers in this embodiment of the invention;

Fig. 16 is a longitudinal view, partly in section, of a recording mechanism and its associated magnetic clutch drive connected to the upper end of the transformer compartment of the instrument shown in Fig. 6;

Fig. 17 is a longitudinal view at right angles to that shown in Fig. 16, partly in section, and showing the recording mechanism and magnetic clutch;

Fig. 18 is a schematic electrical circuit diagram illustrating the electrical components and connections of a system for use in connection with the embodiment of this invention, illustrated in Figs. 16–17, Figs. 18A and 18B show curves representing the minimum and maximum feeler deflections of an instrument of the type shown in Figs. 6–17, provided with the circuit shown in Fig. 18;

Figs. 18C and 18D show curves representing the electrical signal outputs of transformers respectively connected to the minimum and maximum deflection feelers of the circuit shown in Fig. 18; these figures are shown opposite the transformers in the circuit of Fig. 18 which provide the respective signals;

Figs. 18E and 18F show curves representing, respectively, the cathode output signals from the synchronous detectors in the circuit of Fig. 18 which are impressed upon the minimum and maximum deflection buses due to the minimum and maximum feeler deflections, respectively, and are shown opposite the respective detectors providing the illustrated signals;

Fig. 18G shows a curve representing the output signals of a mixer to be impressed upon a recording head, in which the minimum and maximum signals from the two buses are separately discernibly mixed;

Fig. 19 is a schematic electric circuit diagram illustrating another electrical circuit, for use in an instrument such as that shown in Figs. 1–17, in which the signals from the maximum and minimum deflection buses are adapted to be separately discernibly impressed upon a recording head in the form of a rectified signal mixed with a frequency modulated signal;

Figs. 19A and 19B show curves representing the minimum and maximum feeler deflections of an instrument of the type shown in Figs. 6–17, provided with the circuit shown in Fig. 19;

Figs. 19C and 19D show curves representing the electrical signal outputs of transformers respectively connected to the minimum and maximum deflection feelers of the circuit shown in Fig. 19; these figures are shown opposite the transformers in the circuit of Fig. 19 which provide the respective signals;

Figs. 19E and 19F show curves representing, respectively, the cathode output signals from the synchronous detectors in the circuit of Fig. 19 which are impressed upon the minimum and maximum deflection buses due to the minimum and maximum feeler deflections, respectively; these figures are shown opposite the synchronous detectors in the circuit of Fig. 19 which provide the respective signals;

Figs. 19G and 19H show curves representing the electrical signal outputs of the filters respectively connected to the minimum and maximum buses of the circuit shown in Fig. 19; and Fig. 20 illustrates a modification of the electrical circuit connections of the differential transformers of any of the illustrated overall electrical circuits which would provide for the determination of the maximum and minimum diametrical internal dimensions of a tube or casing by such electrical circuits.

Reference to Fig. 1 reveals a length of pipe, casing, tubing or the like 1, in which the tool is situated. Such pipe or tubing may be located anywhere, but this invention is most particularly adapted for being run into a high pressure oil well or the like, where the tubing is in a generally vertical position and the tool itself is likewise in a generally vertical position. Scattered along the tubing 1, there are corrosion pits 2 which it is desired to both detect and measure.

The external body of the tool is illustrated in Fig. 1. Sectional views of the body are shown in Figs. 2, and 4A through 4D. At the upper end of the body, coupling means are provided for securing the tool to a wire line 5 or some other means for controlling the movement of the tool in the tubing 1. In normal operation, the tool is lowered into the tubing on the wire line while locked in an inoperative position. Then it is pulled upwardly. Upon reversal of direction of movement, it is unlocked and commences its calipering operation, making a permanent record of the condition of the tubing being calipered as it rises out of the well.

The body may be characterized as being divided into two main parts, an upper cylindrical portion 6 which is adapted for connection to the wire line 5, and a lower cylindrical portion 7. Protruding from the body from between the upper portion 6 and the lower portion 7, are feelers 8 which do the actual calipering.

The upper body portion 6 termniates at its lower end in an upper plug 10 which is fitted into the lower end of the cylindrical body portion 6. Similarly, the lower body portion 7 is closed near its upper end by a plug 11. The plugs 10 and 11 are secured to each other by a feeler mandrel 12, around which the feelers 8 are mounted.

The feelers 8 accomplish their measurement of corrosion pits, scale, and the like, by making sliding contact with the wall of the tubing 1 and engaging the surface irregularities, such as corrosion pits 2, as the tool is raised through the tubing. While the illustrations depict only eight feelers, it is preferred to have as large a number of feelers as is practicable for the size tool under consideration, so that maximum coverage of the surface of the tubing 1 can be accomplished in one pass of the caliper of the tubing.

The feelers 8 may be mounted in several manners. In this embodiment, each feeler 8 is a leaf spring, and all of them are grouped around the feeler mandrel 12. Conveniently, the feelers 8 may be formed from a single cylinder which is subjected to a series of radial cuts every few degrees around the circumference of the cylinder, such cuts extending from the upper end of the cylinder to within about half an inch or an inch from the bottom thereof, so that the various leaf spring feelers 8 remain integrated in one piece at the bottom. This one piece assembly of feelers 8 may be hereinafter referred to as a feeler head.

An inwardly extending shoulder 14 may be provided near the lower end of the feeler head to cooperate with an outwardly extending shoulder 15 on the mandrel 12. The feeler head may be further rigidly secured to the lower end of the feeler mandrel 12 by a sleeve 16 which fits over the lower end of the feeler head. The sleeve 16 may also have an inwardly extending shoulder 17 coextensive with the shoulder 14, so that the shoulders 14 and 17 may be secured by being bound between the outwardly extending shoulder 15 and the plug 11. Thereby, the feeler head and the sleeve 16 are both rigidly secured to the mandrel 12 and to the other body elements of the tool.

The upper ends of the feelers 8 are adapted to move radially (i.e., laterally with respect to the tool body) inwardly and outwardly. The practical limit of their inward motion is determined by contact with the feeler mandrel 12 and appurtenant parts; the limit of outward feeler motion is determined by the sleeve 16.

Adjacent to the upper end and on the outside edge of the feelers 8, tungsten carbide points are mounted. These points are adapted to make sliding contact with the surface of the pipe 1. The spring action of the body of the feelers 8 operates to urge the feeler points into any pits or other variations in the pipe surface. It is important to note that the feelers 8 move more or less independently, so that one or more feelers may move outwardly into cavities in the pipe surface while others remain stationary and still others are moved inwardly by scale formation, all at the same time.

Protruding in a generally vertical direction through the plug 10, there is a plurality of followers 20, preferably one for each feeler 8. The upper ends of the feelers 8 are angled so that when a feeler moves outwardly, a follower 20, riding on the upper end of the feeler, is moved upwardly, and when a feeler 8 moves inwardly, the corresponding follower 20 moves downwardly.

Each follower 20 is adapted to follow a feeler 8 by means of a T 24, carried on the end of the follower, which T slides within a slot 26 in the end of the feeler. See Figs. 2, 4C, and 5.

Conveniently, Sylphon seals 22 may be placed around each follower 20 at the place where it protrudes from the plug 10 to keep well fluids, sand, and the like from getting into the tool.

Inside the body 6 just above the plug 10, there is a chamber which can be referred to as the transformer chamber 23. In it there is housed a linear differential transformer 21 for each follower 20. One form of transformer structure is indicated schematically in Fig. 4C, with another schematic representation of what is really the same transformer structure being indicated in Fig. 3.

The preferred transformers have coils wound on nonmagnetic spools 25 of the type illustrated in Fig. 4C. A small cylindrical space occupies the center of the spool, and is open only at one end. A core 27 of magnetic material is positioned within that space. Means are provided for moving the core with respect to the primary coil of the transformer, in response to the follower movements. Conveniently, this may be done by making the upper end of an otherwise nonmagnetic follower, out of magnetic material, and positioning the transformers and the followers so that the followers may extend directly into the transformers.

As illustrated in Fig. 3, the primary coil 28 of the transformer is in two parts, one part at one end being wound clockwise while the other part at the other end is wound counterclockwise. Preferably the secondary coil 29 is positioned at the center of the primary coil. The reverse of this arrangement of primary and secondary coils may be preferred at times and is illustrated in other embodiments of this invention. As the core 27, i.e., the magnetic tip on the follower 20, is moved axially of the primary coil, then more or less coupling between the secondary coil and one or the other opposed ends of the primary coil is effected. If the primary coil is substantially longer than the core, the degree of coupling with either end of the primary coil can be made to be a substantially linear function of the movement of the core, within certain limits of motion.

When the core is exactly centered, the coupling from both ends of the primary coil is equal, so that no signal is derived from the secondary coil. For certain purposes it may be desirable to operate only on one side of this zero point, and the dimensions of the parts can be adjusted so that the core 27 is centered when the corresponding feeler 8 is at the innermost limit of its movement, and so that the core is at its maximum distance from center when the corresponding feeler is at the outermost limit of its movement.

Frequently, however, for reasons hereinafter explained, it is desired to operate on both sides of the zero point, so that a record can be obtained that permits determination of both the outermost feeler and the innermost feeler at any given point in the calipering operation. Hence, the dimensions of the parts may be chosen so that the core 27 is centered with the corresponding feeler 8 at the nominal inside diameter of the tubing to be calipered. With this arrangement the outermost feeler will produce a signal indicative of the extent of outward movement into a corrosion pit or the like, and the innermost feeler will produce a signal 180° electrically out of phase with the previously mentioned signal, and which is indicative of the extent of the inward movement of a feeler in response to scale deposit or other inward protrusion.

Means are provided for supplying alternating current power to the primary of the transformer. This may take the form of a battery powered oscillator 30 which generates a signal of say 800 c.p.s., that is applied through a line 32 to the primaries of all the transformers 21, as illustrated in Fig. 3.

The secondary coils 29 of the transformers 21, are preferably wound on the same spools 25 as the primary coils 28. Each secondary coil is connected to a rectifier 31. Each rectifier 31 is adapted to conduct from a secondary coil 29 to a bus-line 33.

Alternatively, and preferably in some applications of the invention, the coil wound in only one direction may be connected to the 800 c.p.s. source as the primary of the transformer, and the coil with two oppositely wound sections may be the secondary connected to the bus-line 33.

The feeler 8 which is outermost at any given time causes its corresponding follower 20 and the core of its corresponding transformer to be uppermost at the same time, thus coupling the corresponding secondary coil with the upper end of its respective primary coil more than is the case in the other transformers whose respective feelers are not so far out. Hence, the secondary coil corresponding to the outermost feeler has induced therein a larger signal than the other secondary coils. It is this secondary, then, that determines the potential received by the bus-line 33 through the rectifiers 31 during one-half of each cycle of the alternating current signal.

It is apparent that the potential of the bus-line 33 during the rectified and passed half cycles corresponds to the position of the outermost feeler 8, while the potential of the bus during the other half cycles is unaffected by any feeler which is extended outward from the zero point. The bus-line 33 thus is always at the maximum potential controlled by the position of the outermost feeler. The bus-line 33 selects the outermost feeler and the potential of the electrical signal received by the bus-line 33 varies in accordance with the positions of the outermost feeler 8 under these conditions.

In case the differential transformers are constructed so that the center positions of the cores 27 correspond to the normal or undeteriorated internal diameter of the tubing being calipered, the foregoing half cycle voltage pattern is developed by such feelers as may move outwardly into a pit. When a feeler in such an arrangement engages some scale and is thereby moved inwardly from the zero potential point, such a feeler produces a response in its corresponding secondary coil which is 180° electrically out of phase with signals induced in secondaries of transformers associated with feelers engaging pits in the surface undergoing measurement. Rectification of these 180° out of phase signals by the same rectifiers acting on the in-phase signals, that is, with all rectifiers acting in the same direction, results in a half cycle voltage pattern 180° electrically out of phase with the pit-engaging feeler signals. These half cycle out of phase pulses are indicative of the distance inwardly of an inwardly extending feeler, and the innermost feeler determines the amplitude of these half cycle voltage signals on the bus-line.

The potential impressed upon the bus-line from some feelers extending outwardly and others extending inwardly from a medial position resolves itself into a pattern in which alternate half cycles are indicative of the position of the outermost feeler, and the intermediate alternate half cycles are indicative of the position of the innermost feeler. The two different signals may be synchronously separated and detected from the ultimate record by conventional means, thereby affording an indication of surface variations either inwardly or outwardly from the normal internal diameter of the tubing.

Returning now to the circuit illustrated in Fig. 3, an amplifier 34 is connected to the bus-line 33 to amplify the signal or potential carried by the bus-line, and means for recording that signal are provided. Conveniently, there may be a magnetic recording head 36 connected by a line 35 to the amplifier 34 and adapted to record upon a magnetic wire or tape 37. Wire is preferred in this invention because of its smaller bulk and its greater resistance to conditions of heat and pressure frequently encountered in deep wells, but magnetic tape recording, optical recording, or any other kind of recording may be used in appropriate applications of the invention.

Transformers of the type described are known as linear differential transformers, and are preferred for this invention. However, other types of variable coupling may be used. For example, if a nonlinear transformer coupling is used, then the recorded indication of a corrosion pit ⅛ inch deep, will not be twice as large as the recorded indication of a corrosion pit 1/16 inch deep, thus making it much more time consuming and difficult to interpret the records made by the instrument.

It is noted that Fig. 3 illustrates only four transformers, whereas there actually is a transformer for each follower. Similarly, for purposes of simplicity and readability of the drawings, Fig. 4 has been drawn to show only two feelers 8, two followers 20, two transformers 21, and two rectifiers 31, whereas there actually should be a fairly large number of feelers, with a follower, transformer, and rectifier for each.

The feelers 8 of an assembly such as that appearing in the drawings and described herein, are entirely independent of each other in their movements when the tool body 6—7 is held still. However, when the tool body 6—7 is suspended from a wire line inside of tubing, pressure on one feeler necessarily tends to shift the body away from the center of the tubing, thereby affecting the degree of extension of the other feelers. The feelers are seen to operate with some degree of interdependence, and the greater this interdependence, the less accurately does a feeler measure pit depth. This off center shift may be minimized by the use of a large number of feelers 8. Alternatively, the idea embodied in the centering spring mechanisms of United States Patents 1,329,456 or 2,142,465, may be adapted to the structure here disclosed, to completely eliminate the off center shift which otherwise may make the feelers operate with some interdependence.

Conveniently, the upper body portion 6 may be divided into various chamber for most convenient housing of the various electrical and electro-mechanical parts which have been described. An upper chamber 40, defined by partitions 41 and 42, is preferably sealed against pressure variations, and houses the battery which supplies the electrical parts, including the oscillator 30 and the amplifier 34, with power.

Below the partition 42, there may be another partition 44, the two of which define a pressure equalizing chamber 45. There are holes 46 in the wall of the body 6 to permit fluid communication between the outside of the tool and the chamber 45. The holes 46 are covered on the inside of the chamber 45, with a flexible diaphragm 47. The various chambers of the upper body portion 6, excepting the sealed chamber 40, communicate with each other and are preferably filled with clean oil or the like. This oil is maintained at the same pressure with the well fluids by the action of the diaphragm 47.

Some distance below the partition 44, there is another partition 50. The partitions 44 and 50 define the recording chamber 51. Within the recording chamber 51, there are housed two magnetic wire spools 54 and 55, with the recording head 36 positioned therebetween and adapted to have magnetic wire passed thereby. Protruding into the recording chamber 51, there is a shaft 57, hereinafter more particularly described, which provides the driving means for the spools 54 and 55 through appropriate gearing and belt coupling 58.

The transformer chamber 23 is defined by the partition 50 and the plug 10, as elsewhere indicated, and houses the transformers 21 and, if desired, the rectifiers 31. Alternatively, the rectifiers 31 may be positioned within the pressure sealed chamber 40.

Means for driving the shaft 57 in response to the movement of the tool along the tubing being calipered are provided. While such means may be located at various places, in the embodiment illustrated they are positioned in the lower body portion 7, as shown in Fig. 4D.

The lower body 7 includes therein a partition 59 a short distance below the plug 11. A drive wheel 60 is rotatably mounted on an arm 61 which is in turn hingedly secured to the partition 59. There is an opening 64 in the wall of the body 7, through which the wheel 60 is resiliently urged by a spring 65. As appears in Fig. 1, the drive wheel 60 engages the wall of the tubing 1 and is rotated thereby as the tool is moved along the tubing. Appropriate gearing and a universal joint transmit the rotation of the drive wheel 60 to a gear box 67 located between the partition 59 and the plug 11. The gearing transmits the rotative motion to the lower end of the shaft 57 which extends downwardly through the plug 10, through the center of the feeler mandrel 12, and through the plug 11, into the gear box 67.

Means are provided for retaining the drive wheel 60 in a retracted position during the descent of the tool into the well. Conveniently, this may take the form of a pin 70 protruding into the drive wheel chamber 71 from the lower end thereof. Below the pin 70, there is positioned a block 72 with a hole 73 therein. When the block 72 is centered, the lower end of the pin 70 fits into the hole 73 and moves downwardly. However, if the drive wheel 60 is pushed inwardly, and the pin 70 is moved upwardly, the block 72 is moved off center by action of springs 74 or other convenient means, so that the block holds pin 70 in its upper position. In this upper position, the pin 70 engages the drive wheel arm 61 and holds it in the retracted position, so that the drive wheel 60 does not engage the tubing during its descent into the well.

Laterally of the block 70, there is an elongated pawl 75 mounted on a slot hinge joint. The pawl 75 is adapted for rotation between two primary positions. In its more or less horizontal position, as illustrated in dotted lines in Fig. 4D, the pawl 75 protrudes from the body 7, while in its vertical position, the pawl is completely within the body 7. When the pawl 75 is in the horizontal position, the block 72 is urged by the springs 74 into contact with the inside end of the pawl 75. This end of the pawl 75 is so shaped that the pawl may rotate somewhat in a counter-clockwise direction, without affecting the position of the block 72, but any clockwise rotation of the pawl 75 pushes the block 72 against the force of the springs 74 toward its centered position, thus permitting the pin 70 to drop and release the drive wheel 60. Thus, during the descent of the tool into the well, the pawl 75 is in its horizontal position, being tilted now and again in a counter-clockwise direction by bumps encountered along the way. As soon as the tool is pulled upwardly, however, the pawl 75 engages a rough spot or the crack at a joint between two lengths of pipe, and is rotated 90° clockwise, kicking the block 72 inwardly so as to release the drive wheel. Conveniently, a small coil spring 77 may be connected to the pawl 75 to tend to move it clockwise, but the action of this spring 77 must not be as strong as that of the springs 74 acting on the block 72.

Means are also provided for holding the feelers 8 retracted during descent into the hole, and for releasing them to commence their calipering operation when the tool commences its upward movement. Conveniently, a sleeve 80 may be placed around the upper end of the feeler mandrel 12. The sleeve 80 is normally urged upwardly by a spring 81. At its upper end, there is a hat 82 of a collar form, adapted to fit down on top of the feeler ends and hold them in, once they have been moved inwardly and the hat lowered on them.

Means are provided for holding the hat 82 down on top of the feelers 8, and for releasing it when the drive wheel starts the gears in the gear box 67 moving. A rod 83 is secured to the lower end of the sleeve 80, and extends down into the gear box 67. There it is adapted to be received into a nut 84 which is carried by a gear. With the feelers in, and the hat down, the drive wheel 60 is rotated backwards a turn or two by hand, thus screwing the nut 84 onto the rod 83 and holding it down. However, as soon as the drive wheel 60 is released for calipering, and commences to turn in the normal direction, the nut automatically unscrews the rod 83, and releases the rod 83, sleeve 80, and hat 82 to rise upwardly in response to the urging of the spring 81, thereby releasing the feelers 8 to move outwardly and commence the calipering.

Another embodiment of this invention is illustrated in Figs. 6 through 17, with suitable electric circuits for this embodiment shown diagrammatically in Figs. 18 and 19. As in the previously described embodiment, the measuring instrument or caliper preferably is constructed with a housing formed of a series of connected compartments into which major operational subcombinations can be assembled and disassembled with relative ease. Such an assembly of parts not only facilitates initial assembly and subsequent repairs, but also facilitates a resetting of the mechanism to permit the insertion of the instrument into the hollow body, such as a tube or casing of a well, with only the initial triggering mechanism exposed. It also enables the provision of substantially closed compartments or sections within the housing for the protection of equipment which might be damaged by the entrance of foreign materials into the parts of the mechanism or the electric equipment within such compartments.

Fig. 6 illustrates the general assembly of the instrument in a segmental housing and shows the instrument in position for lowering into a tube or well casing. This housing is shown as comprising five compartments all suitably secured together. The end or lowermost of these compartments 100 is formed with a plunger tip 101 and is adapted to house the latch and tripping mechanism which is used to hold and place the measuring instrument in inoperative and operative condition, respectively. This compartment is suitably secured to the second compartment 102, as by threaded engagement therewith at 103, and the latch and tripping mechanism therein is mechanically operatively connected to a drive and feeler sensing mechanism in this second compartment. Both of these compartments are open to the exterior of the housing, as the mechanical parts therein are adapted to be activated by engagement with the surface of the body undergoing measurement. The remainder of the measuring instrument preferably is sealed from the exterior of the casing to prevent the entrance of foreign material therein which might be deleterious to the equipment in the remainder of the housing.

Compartment 102 of the housing is secured to a third compartment 104 in any suitable manner, as by screw threaded engagement therewith at 105. This third compartment 104 is adapted to contain various transformers which are electrically connected to equipment in other compartments of the instrument, and some of which are mechanically associated with the feeler sensing mechanism in compartment 102. A mechanical drive for operating a recorder also extends through this third compartment 104 from the second compartment 102.

A fourth compartment 106 is suitably secured to the transformer compartment 104 by threaded engagement therewith at 107 and is provided with a special seal at the juncture of these compartments. This seal is formed by a substantially hemispherical sealing dome 108, provided with an annular mounting flange 109 which is clamped in position in a complementary annular seat between the end of the compartment 104 and the associated end of the compartment 106. It is particularly desirable that compartment 106 be substantially hermetically sealed as this compartment contains the recording device which is adapted to make a record of the surfaces which are calipered by the instrument.

The recording device and the other electrical equipment are adapted to be suitably energized from a source of electrical power which may comprise various batteries and the electrical connections thereto. These batteries preferably are contained in a separate compartment 110 which is secured to the recorder compartment 106 in any suitable manner, as by screw threaded engagement therewith. In this instance, the connection between the compartments may include a flexible connection, such as a conventional ball and socket knuckle join (not shown) in order to provide more flexibility to the long housing of the instrument to facilitate the traverse of the instrument in tubing or casing which may not be straight throughout its extent. This type of flexible joint would not be practical for most of the connections between the other compartments as operating parts or cooperating elements extend through the joints between the other compartments. This battery compartment 110 forms the uppermost compartment of the housing, and it is adapted to be suitably secured to a flexible suspension line 111 through a cap 112. This cap preferably is formed with wrench flats 113 which provide convenient gripping surfaces for securing the instrument and disconnecting it from its suspension line 111, as is usually required at the beginning and completion of each calipering survey.

As is more clearly shown in Fig. 6, this compartmental assembly of the instrument housing provides a construction having a substantially smooth outer surface which facilitates its insertion and withdrawal from a tube or casing 114. In order to insure the free and unobstructed descent or insertion of the measuring instrument into the tube or casing, its sensing and driving surface engaging elements are latched within the housing prior to its insertion into a tube, and the instrument then is lowered into the well with only a small part of a centering block 115 and the end of a trigger 116 of the tripping mechanism extending outwardly of the casing. The centering block 115 is pivotally mounted at one end thereof by a pivot pin 115' within a recess in the compartment 100 opposite the trigger 116 and is resiliently biased outwardly by a pair of springs 115'' so as substantially to balance the pressure of the trigger 116 in the opposite direction. This tends to maintain the lower compartment 100 of the instrument substantially centered within a well tube or casing when it is inserted therein with the centering block 115 and the trigger 116 in engagement with the inner walls of the casing.

The desired operation of a measuring instrument or caliper, of the type to which this invention pertains, which makes a record of the dimensions or surface variations of the body undergoing measurement, is dependent upon a coordinated operation or drive of the recording mechanism and of the surface sensing elements. In order to obtain this coordinated action, the measuring instrument is provided with a source of driving power and surface sensing elements which simultaneously contact the surface being calipered so as to provide a coordinated record. Since such a record is obtainable for most practical purposes by a single traverse of the instrument over a surface, a latching mechanism is provided for retaining the driving and sensing elements in latched position within the housing as the instrument is inserted into a well tube or casing. This latching mechanism is illustrated in detail in Figs. 7, 8, and 11 and is housed, for the most part, in the lower end compartment 100.

The entire operating mechanism of the instrument is retained in latched position as long as its primary source of driving power, which comprises a drive wheel 117, is held in an inoperative position. This is provided by mounting the drive wheel 117 on a shaft suitably journaled in a pivotally mounted frame 119, which provides for the retraction and extension of the drive wheel 117 in and out of the compartment 102. This frame 119 is secured to a mounting pin 120, journaled in a mounting block 121 which extends transversely across the compartment 102 and is suitably secured in position in this compartment of the housing. A pair of leaf springs 122 are secured to the mounting block 121 and press upon one side of the frame 119 so as to exert a force thereon tending to bias or swing the frame 119 towards one side of the compartment 102. Under predetermined conditions, the frame 119 is releasable and is swung outwardly by the springs 122, carrying the drive wheel 117 therewith to protrude out of the compartment through a longitudinally extending slot or window 123 in the side of the compartment 102 and into engagement with the surface which is being calipered by the instrument.

In order to latch the drive wheel 117 out of its operative position and to hold it within the compartment 102 during the descent of the instrument into a well casing, a latching mechanism is provided which can be readily released under predetermined conditions when it is desired to start the calipering of the tube or casing. This latching mechanism includes a plunger 124 which is formed with a pointed end 125 adapted to extend into a complementary socket in the lower portion 126 of the frame 119. This plunger 124 extends into a two-part housing comprising a lower cylindrical head section 127 and an upper cylindrical head section 128. The lower head section 127 is formed with an annular shoulder arranged in engagement with a complementary seat on the adjacent upper end of the trigger compartment 100 and is secured in position by the upper head section 128, which threadedly engages the adjacent end of the trigger compartment 100 at 129. Both of the head sections 127 and 128 are formed with an axially extending central cylindrical bore in which a guiding collar 130 on the plunger 124 is adapted to reciprocate. Both outer ends of the bore are closed by inwardly extending flanges 131 and 132 formed, respectively, on the outer ends of the cylindrical head sections 128 and 127 so as to retain the plunger collar 130 therein. The plunger 124 is adapted to be held in its frame latching position, with the pointed end 125 thereof in engagement with the socket in the end 126 of the frame 119, by being secured in this position by a latching finger 133. This latching finger 133 is swingably mounted on a pin 134 journaled in the sides of the trigger compartment 100 and is provided with a pair of bushings 135 on each side of the latching finger 133 in order suitably to center the finger within the compartment 100. A shear pin 136, preferably of brass or similar easily sheared material, extends through an opening in the lower end of the latching finger 133 and is secured in the sides of the compartment 100 so as to hold the latching finger 133 in latched engagement with the lower end of the plunger 124. This position is shown in Figs. 7, 8, and 11.

After the desired depth has been reached by the instrument, it is retracted up the well bore and the trigger 116 is adapted to press against the latching finger 133 in such a manner as to urge it out of engagement with the adjacent lower end of the plunger 124. In order thus to release the latching finger 133, the trigger 116 is formed with a cavity engaging end 137 which is adapted to ride over the inner surface of the well casing 114 and to extend into a cavity such as is formed between casing sections where they are joined together, as by a collar 138. The trigger 116 is pivotally mounted on a pin 139 mounted on the sides of the compartment 100 and extending through a mounting slot 140 adjacent the upper rear corner of the trigger. The inner side of the trigger 116 is formed with a cam surface 141, which is normally held in engagement with the adjacent side surface of the latching finger 133 by a tension spring 142 suitably secured at one end to a boss 143 on the side of the compartment 100 and to a spring pin 144 on the trigger 116. In order to obtain the desired operation of the trigger, it normally is held by the spring 142 biased into engagement with the surface which is being calipered. This is assured by securing the spring pin 144 to the trigger 116 on the outer side of a line through the center of the mounting pin 139 and the point on the boss 143 to which the spring 142 is attached. The point of attachment of this spring pin 144 to the trigger 116 also should be on the side of the mounting slot 140 away from the normally upper side 145 of the trigger. In this manner the spring 142 will always tend to bias the trigger 116 into its operative position.

The construction of the trigger 116 and its mounting in the compartment 100 is such that the outer end thereof is adapted to extend outwardly through a window 146 in the side of the compartment 100, under most operating conditions. When the instrument is being lowered into the well casing, the end 137 of the trigger rides over the inner surface of the casing and, if it encounters irregularities in the casing surface, it is merely momentarily swung upwardly and is then returned to its operative position by the biasing spring 142. The cam surface 141 on the rear edge of the trigger is formed so that the trigger can be turned upwardly completely into the compartment 100 without exerting any force against the latching finger 133. This is provided for by forming the cam surface around the corner of the trigger adjacent to the pin 139 as a curve substantially on the same center as the adjacent semicircular end of the slot 140. This curved cam surface, together with the elongated configuration of the slot 140, enables the trigger 116 to be turned upwardly around the pin 139 to any extent necessary to prevent its interference with the free passage of the instrument into a casing, and the spring 142 will provide for its immediate restoration to its operative position.

A simple upward movement of the instrument through the well casing will cause the cavity engaging end 137 of the trigger 116 to engage the upper side of the cavity, such as that between the ends of adjacent casing sections 114, as in the position shown in Fig. 7, and will temporarily prevent this end 137 of the trigger from moving upwardly with the instrument. This causes the outer end of the trigger 116 to pivot downwardly around the pin 139 and turns the lower corner of the cam surface 141 inwardly against the adjacent surface of the latching finger 133. Further upward movement of the instrument causes the trigger 116 to turn still further in this direction, which is seen as a clockwise direction in Fig. 7, so as to turn the upper end of the latching finger 133 around the pin 134 away from the window 146, in a counter-clockwise direction as seen in Fig. 7. This turning of the latching finger 133 causes it to shear the pin 136, so as to release the latching finger and permit it to turn under the biasing action of the cam surface 141. Further movement of the instrument upwardly through the casing causes the trigger 116 to turn further downwardly into the compartment 100 and to bias the latching finger 133 further away from the window 146, until a curved undercut guide surface 147 of the finger passes under the lower end of the plunger 124. When this occurs, a compression biasing spring 148, which is seated between the upper head flange 131 and the plunger collar 130, will bias the plunger 124 downwardly out of engagement with the socket in the lower end 126 of the frame 119. This releases the frame 119, and the springs 122 bias it outwardly towards the window 123, thereby placing the drive wheel 117 into frictional driving engagement with the inner surface of the well casing 114.

With the drive wheel 117 in frictional engagement with the surface of the casing, further retraction of the instrument upwardly through the casing will cause the wheel 117 to rotate and to turn the shaft 118 to which it is secured. This shaft 118 is formed with a worm 149 on one end thereof arranged in driving engagement with a cooperating worm wheel 149', which is mounted in driving engagement on a shaft 150. This shaft is journaled in suitable bearings 151 and 152 mounted on a boss 153 extending integrally from a side of the pivotally mounted frame 119 and is thereby adapted to move bodily with the frame 119. This provides a pivotally mounted source of driving power, so that it is necessary to provide a universal joint connection from the drive shaft 150 to the remainder of the driving mechanism of the instrument. This is conveniently provided by connecting the upper end of the drive shaft 150 through a universal joint 154 to the end of a stubshaft 155 supported by a bearing 156 in the mounting block 121 and extending into a main gear casing 157.

This main gear casing 157 is arranged within the sensing mechanism compartment 102 directly above the mounting block 121 and contains gearing which is primarily intended to increase the speed of the drive shaft of the recorder over the speed obtainable directly from the drive wheel 117. This increase in speed is desirable as the speed of the drive wheel 117 normally will be relatively low and the best operation of a recorder is obtainable when it is driven at relatively high speeds. This step-up gearing includes a spur gear 158 fixed to the stubshaft 155 and arranged in driving engagement with another spur gear 159 fixed to a countershaft 160, suitably supported by bearings 161 and 162 in the mounting block 121 and the gear casing 157, respectively. The step-up gear train further includes another set of spur gears 163 and 164, respectively drivingly mounted on the stubshaft 160 and a second countershaft 165. The second countershaft 165 is suitably supported in bearings 166 and 167 mounted respectively in second and third mounting blocks 168 and 169. These two mounting blocks 168 and 169 are arranged with their adjacent radial faces in engagement with each other, and the gear housing 157 is formed with an annular groove on one end thereof which forms a seat for an annular collar 170 on the opposite radial face of the mounting block 168 so as to assure proper axial alignment of these three members. The other end of the gear box 157 is formed with an annular collar 171 which is seated in a complementary groove formed on the adjacent radial face of the mounting block 121. For convenience in assembling the various parts of the mechanism in the drive and feeler compartment 102, the mounting block 169 is welded in position in the compartment 102, and the various mounting blocks, gear casing, and associated parts are then assembled in the compartment 102 from the end thereof adjacent to the latching mechanism. This mounting block 169 forms a convenient separation between the gear trains of the driving mechanism and the sensing mechanism in this compartment.

The mechanical drive of the recorder is transmitted from the gearing in the gear casing to the recorder through a drive which extends through the sensing mechanism and the transformer compartment 104 into the recorder compartment 106 without interference with the mechanism or the electrical apparatus in these other compartments. This drive includes a spur gear 172 drivingly mounted on the counter shaft 165 and arranged in driving engagement with another spur gear 173 mounted on a spur shaft 174 supported in bearings 175 and 176 mounted in the mounting block 168. The end of the spur shaft 174 opposite the gear 173 may be conveniently formed with a square or hexagonal end 177 arranged in driving engagement with a complementary square or hexagonal socket in the end of a coupling 178. The coupling 178 is rotatably supported by anti-friction bearings 179 mounted in the mounting block 169 and is conveniently formed with a splined upper end 180 arranged in driving engagement with a complementary splined end of a main drive shaft 181. This main drive shaft 181 extends through a tube 182 which is seated in a groove in the upper side of the mounting block 169 and extends continuously upwardly through the compartment 102 to the upper end thereof where it is seated in a transversely extending wall 183, which forms a closure for the upper end of the compartment 102. A second tube 184 sealingly engages the end of the tube 182 in the transverse wall 183 and extends continuously upwardly through the transformer compartment 104 to the upper end thereof, where it is supported in sealing engagement with a transverse wall 185 secured to the upper end of the compartment 104.

In order to provide for completely sealing the recorder compartment 106, mechanical driving power is transmitted from the main drive shaft 181 to the recording mechanism through a magnetic clutch. This clutch comprises a pair of permanent magnets 186 and 187 respectively mounted on the end of the main drive shaft 181 and a driven shaft 188 and are mounted on opposite sides of the sealing dome 108. As is best shown in Figs. 16 and 17, the adjacent complementary faces of the permanent magnets 186 and 187 have partial spherical surfaces which are spaced a slight operating clearance distance on either side of the adjacent surfaces of the dome 108. This sealing dome 108 preferably is made of nonmagnetic material, such as brass, so as not to interfere with the magnetic field of the clutch magnets 186 and 187. In this manner, the desired driving force can be transmitted from the end drive wheel 117 to the recording mechanism to provide a speed of operation of the recording mechanism which is directly proportional to the speed of traverse of the instrument through the well tube or casing. In addition, the substantially hermetic seal formed by the sealing dome 108 between the compartments 104 and 106 provides for a maximum useful life for the recording mechanism and maximum assurance of the reliable operation thereof.

In order to measure and determine surface variations of the interior of a well tube or casing, a plurality of sensing feeler fingers 189 are provided which are formed with contact tips 190 adapted to engage the inner surface of the tube or casing. These feeler fingers 189 are arranged in a circle as a closely spaced cluster and are adapted to be pivotally mounted within the compartment 102 with the contact tips circumferentially arranged opposite a cooperating longitudinally extending slit or feeler window 191 in the wall of the compartment 102. In order to obtain as complete a survey as possible of the interior of the casing, it is desirable to provide as many feeler fingers as possible, so that substantially all surface variations of any material extent will be engaged by at least one of the contact tips of the feeler fingers. As is more clearly shown in Fig. 15, in the illustrated construction, twenty-four of these feeler fingers are arranged circumferentially substantially equally spaced around the periphery of the compartment 102.

In this embodiment of the invention, the accuracy of the sensing mechanism is substantially improved by providing for the pivotal support of each feeler finger independently of each other and free of any mounting connection fixed or secured to the casing or mounting members of the instrument. This independent support of each feeler is provided for by bifurcating the end of each feeler finger opposite the contact tips thereof into two prongs 192 and 193. The inner prong 192 of each finger is rockably seated in an annular groove 194 formed in the lower edge of a mounting collar 195, which is secured in an annular groove on the lower side of the transverse compartment wall 183. This provides for an independently freely rockable mounting of each feeler finger which enables each contact tip 190 to move radially inwardly and outwardly in accordance with surface variations on the interior of a well casing. Such radial movements of the contact tips are translated into electrical signals which are adapted to be recorded by the recording apparatus to indicate the size radially and the extent longitudinally of pits and cavities and of protrusions, such as scale, on the interior of the well casing, and may also be utilized to provide a record of the actual interior dimensions of the casing.

In order to translate the mechanical radial movements of the contact tips 190 into the desired electrical signals, the second prong 193 of the bifurcated end of each feeler finger is formed with an outwardly extending hooked end 196 which acts as a bell crank arm for activating a suitable electric signal varying device. The mechanical movement of the contact tips radially inwardly and outwardly will cause the ends of the bell crank arms 196 to move a proportional arcuate distance around the point of engagement of the other prong 192 on its seat on the collar 195. By forming the angle of the outwardly extending arm 196 substantially at right angles to the axis of its respective feeler finger, the arcuate movement of the end of the arm for the relatively small degree of arc through which it moves, will be substantially equivalent to a tangent to this arc, so that the movement of the ends of these arms will be substantially axially of the instrument and proportional to the substantially radial movement of the contact tips 190.

This axial movement of the ends of the arms 196 is adapted to be transmitted to suitable electric signal varying devices through follower rod elements 197, which are formed with complementary hooked ends 198 arranged in operative engagement with the ends of the arms 196. Each rod 197 extends axially through a passageway 199 in the transverse wall 183 and through a second passageway 200 in a transverse wall 201 which is secured to the upper side of the wall 183 in any suitable manner, as by screws 202.

In most instances the electric signal varying devices will be found to be too large conveniently to arrange as many of these in a circumferential cluster as there are feeler fingers. It, therefore, is convenient to arrange a series of circumferential clusters of signal varying devices and to space these axially in the compartment 104. This can conveniently be done by providing a series of equally axially spaced transverse mounting walls 203 and mounting the current varying devices in substantially equal clusters thereon. In the present instance, three of these transverse walls 203 are provided, on each of which eight circumferentially spaced signal varying devices are supported. Since the three transverse walls 203 are spaced axially along the compartment 104, the follower rods 197 extending from the feeler fingers to the signal varying devices vary in length according to the distance of the feeler fingers to the signal varying devices mounted on each respective wall. In the present embodiment, the follower rods can conveniently be arranged in patterns of three and repeated in a regular circumferential order around the twenty-four feeler fingers, thus placing eight signal varying devices on each wall 203.

With the present independent mounting of each feeler finger, the operative engagement of the follower rods 197 therewith is utilized to maintain the feeler fingers under uniform contact pressure. This is obtained by resiliently biasing the follower elements in a direction axially away from the feeler fingers towards the upper part of the instrument, so as to exert a force on the feeler fingers which biases the end of the inner prong 192 into seated engagement with the surface of the groove 194 in the collar 195, and also urges the contact tips thereof radially outwardly through the windows 191 in the compartment wall. This biasing force is provided by a spring 204 retained under compression between the upper surface of the transverse wall 183 and a suitable spring seat washer 205 secured to the rod 197 by compression adjusting nuts 206.

During the insertion of a measuring instrument into a well casing, it is desirable that the sensing mechanism should remain inoperative, and, therefore, that the feeler fingers should not extend outwardly of the compartment 102. It also is desirable to have these feeler fingers readily releasable for engagement with the inner surface of the well casing as soon as possible after it is determined that the instrument has reached the position at which the desired survey is to begin. According to one aspect of this invention, this can conveniently be provided by forming the ends of the feeler fingers opposite the pronged end thereof in the form of a tapered point 207 which can be readily latched and released by engagement with a complementary conical surface 208 on an axially movable latching tube 209. This tube 209 conveniently may be arranged in close sliding engagement with the outer peripheral surface of the tube 182 and is adapted to move towards and away from the ends 207 of the feeler fingers within the compartment 102 and on the upper side of the transverse wall 169, which is rigidly secured to the compartment 102. Fig. 13 shows the feeler fingers and the latching tube 209 in latched position, in the manner in which these elements are arranged during the insertion of the instrument in the well casing. Fig. 14 shows the feeler fingers 189 and the latching tube 209 in released positions, with the contact tips of the feelers in engagement with the inner surface of the well casing, in the positions of these members during the measurement of the casing when the instrument is being withdrawn therefrom.

Operation of the latching tube 209 is obtained by activating it in response to the initial turning of the drive wheel 117 during the initial retracting movement of the instrument in the well casing. The activating mechanism for operating the latching tube 209 and the operation of this mechanism will be best understood by reference to Figs. 9, 10, 11 and 12. As shown in these figures, the latching tube 209 is formed with a collar 210 on the lower end thereof which is detachably secured to an operating pin 211. This connection of the latching tube to the pin 211 is made through a latching spring 212, arranged within a passageway 213 in the collar 210 and secured therein between two end plates 214 and 215, which are held together in any suitable manner, as by a plurality of screws 216. The spring 212 is adapted releasably to engage a substantially spherical head 217 on the operating pin 211 and normally forms a driving connection between the operating pin and the latching tube. This operating pin 211 extends through the transverse wall 169 and is provided with a worm gear thread 218 on a substantial portion of the end thereof opposite its head 217. This worm gear thread 218 extends axially through the compartment 102 parallel to the main axis of the instrument and is displaced angularly to one side of the countershaft 165, so as not to interfere with the main recorder drive shaft 181, as shown in Figs. 11 and 12. Actuation of the operating pin 211 for activation of the latching tube is obtained by driving the pin axially through the worm gear thread by drivingly engaging this thread with a complementary internally threaded spur gear 219, arranged in driving engagement with another spur gear 220, drivingly mounted on the countershaft 165. In order to insure against rotation of the operating pin with the spur gear 219, a suitable guide key 221 is secured to the lower end of the worm gear threaded portion of the pin 211. This guide key is arranged in sliding engagement with a pair of keyways 222 extending longitudinally along diametrically opposite sides of a longitudinally extending passageway 223 in the mounting block 168. The operating pin 211 is biased downwardly towards the gear box in the compartment 102 by a spring 224, held in compression by seated engagement with the upper side of the guide key 221 and the underside of the lower bearing race of a thrust bearing 225. In this manner when the drive wheel 117 is released and biased into engagement with the inner surface of a well casing, retraction of the instrument upwardly through the casing causes the drive wheel 117 to transmit mechanical driving power through the gearing connected to its worm 149 to the countershaft 165 and from the countershaft through the gear 220 to the internally threaded gear 219, so as to cause this latter gear to rotate. Rotation of the spur gear 219 causes its internal threads to drive the worm gear threaded portion of the pin 211 longitudinally downwardly. This results in a retraction or axially downward movement of the latching tube 209 until the conical surface 208 thereof has become disengaged from the tapered points 207 of the feeler fingers 189, thus permitting the radial movement outwardly of the contact points of the feelers through the windows 191 and into engagement with the casing surface which is to be calipered.

After the feelers have been released in this manner, it is necessary that provision be made to stop the retraction of the latching tube 209. This is accomplished by disengaging the driving connection between the internal threads of the spur gear 219 with the worm gear thread 218 of the pin 211. This disconnection is brought about by providing a relief portion 226 on the pin 211 at the upper end of the worm gear thread 218. When the pin 211 is driven downwardly by the internal threads on the spur gear 219, it will move until the worm gear threads thereof have been completely screwed out of engagement with the internal threads on the spur gear 219, and these internal threads extend around the relief portion 226, thus completely breaking this driving connection.

In order to maintain the spur gear 219 in its operative engagement with the gear 221 when disengaged from the worm 218, a longitudinally extending hub 227 is formed on the gear and is arranged in free turning engagement with the outer periphery of a bushing 228. This bushing 228 extends around a portion of the pin 221 adjacent to the relief portion 226, and thus keeps the spur gear 219 properly centered around the pin 211 and in engagement with its drive gear 220. Thus, when the latching tube 209 has been released from its latching position in engagement with the ends of the feeler fingers and the operating pin 211 has been drawn downwardly by its driving gear 219 until the internal threads on this driving gear no longer engage the worm gear threads 218 of the operating pin, the end plate 214 on the latching tube 209 is retracted substantially into engagement with the upper surface of the mounting block 169, and the driving connection between the latching tube 209 and the source of mechanical power is completely broken and cannot be reestablished until the instrument is removed from the well casing and dismounted for resetting purposes.

In this embodiment of the invention, when the feeler fingers 189 are unlatched into engagement with the inner surface of a well casing and free to move in accordance with variations in the surface engaged by the contact tips thereof, the follower rods 197 will reciprocate inwardly and outwardly of the compartment 104 in accordance with the movement of the feelers inwardly and outwardly as they pass over the surface variations. In order to translate this movement of the follower rods into corresponding electrical signal variations, a plurality of linear differential transformers 229 are mounted in the compartment 104 on each transverse wall 203 and are constructed and connected to cooperate with the follower rods to provide the desired electrical signal variations. Each differential transformer may be of any suitable conventional type, and preferably is formed with a single primary winding 230 and two secondary windings 231 and 232 differentially connected, as shown in Figs. 18, 19, and 20. The differential transformers 229 are provided with magnetic cores 233 mechanically connected to the ends of the follower rods 197 and are adapted to be moved longitudinally through the transformer windings in response to activation of the follower rods 197 by the feeler fingers.

In the present embodiment of this invention, the differential transformers preferably are constructed so that substantially equal and opposite voltages are induced in the two secondary windings of each transformer when the cores 233 are centered in the transformers with respect to the primary and secondary windings thereof. With this construction, the differential connection of the secondary windings of each transformer, as shown in Figs. 18, 19, and 20, results in a zero terminal voltage when the feelers connected to the cores are in a predetermined medial position.

In order to assure long useful life to the electrical equipment in compartment 104, the space around the equipment in this compartment preferably is filled with a clear light mineral oil, and the compartment is substantially sealed against the entrance of foreign materials from the outside of the instrument. In order to provide such a seal, suitable bushings 234 are arranged around the follower rods 197 in the passageways 199 through the transverse wall 183, and provision is made for supplying and withdrawing mineral oil to and from the compartment 104 as the follower rods reciprocate outwardly and inwardly of the compartment, as they are actuated by the feeler fingers 189. This control of the supply of the mineral oil in the compartment 104 is desirable in order to maintain the pressure therein substantially constant, so as to minimize the possible leakage into the compartment of the foreign material which might result if the pressure in the compartment were to become lower than that on the outside thereof.

In order thus to control the pressure of the mineral oil in the compartment 104, a suitable reservoir in the form of Sylphon bellows 235 is connected with the interior of the compartment 104 to provide for easy transfer of oil between the reservoir and the compartment. This transfer is conveniently obtained by arranging the Sylphon bellows 235 around the latching tube 209 within the compartment 102 and securing the lower end of the Sylphon bellows to the end plate 215. The upper end of the Sylphon bellows is closed by a plate 236 and sealed against passage of fluid into and out of the bellows by a sealing ring 237 arranged in a groove in the inner periphery of the plate 236 and in sealing engagement with the outer surface of the latching tube 209. The interior of the Sylphon bellows 235 is adapted to communicate with the compartment 104 through the space within the tube 184 and communicating openings 238 through the tube 184 within the compartment 104, and openings 239 in the tube 182 within the compartment 102. These latter openings 239 are adapted to register with openings 240 in the latching tube 209 both when the latching tube is in the position shown in Figs. 9 and 10 for latching the feeler fingers in retracted position, and when the latching tube has been fully retracted to the position in which the feeler fingers are unlatched from engagement with the latching conical surface 208 thereof. In order to assure sufficient pressure on the oil within the Sylphon bellows reservoir to force a sufficient amount of this oil into the compartment 104 and to maintain the oil pressure therein, a spring 241 is held under compression in seated engagement with the outer side of the Sylphon bellows end plates 236 and the adjacent underside of a retaining ring 242 secured in any suitable manner to the latching tube 209, as by a set screw 243. In this manner, the supply of oil within the compartment 104 is always maintained at a substantially constant pressure, regardless of the movement of the follower rods 197 inwardly or outwardly of this compartment, and the entrance of foreign materials thereinto is thereby minimized.

In order to obtain the desired record of the variations in the surface of a well tubing which will indicate the relative degree of pitting or scaling and the longitudinal extent of such variations, as well as the location of the variations in the casing, it is desirable that the electrical signal variations corresponding to the variations in the casing surface should bear a direct relationship to the record of the position of the instrument within the casing. The previously described drive of the recording mechanism through the shaft 188 connected to the magnetic clutch will provide for movement of the member on which the record is to be made in accordance with the movement of the instrument through the casing, and thereby will provide the direct relationship of these two factors. Since the interior of a well casing may have scale formed or deposited thereon, as well as pits in the casing, it has been found desirable to record the positions of the feeler finger contact tips both outwardly past a medial position, which represents the normal internal diameter of the clean casing, and inwardly past the medial position. In most instances, only the maximum pitting and maximum scale formation will be of interest to a determination of the condition of the casing. It, therefore, becomes unnecessary, and in fact generally undesirable, to record the position of all of the feelers, and it is generally both sufficient and desirable to record only the maximum deflection of the feelers outwardly past the medial position and inwardly of this medial position. Any suitable electric signal varying device which will provide a signal responsive to the respective positions of the feeler finger contact tips can be utilized for providing the activating signal, which can then be suitably amplified and passed through a detecting circuit for passing such signals as are indicative of the positions of the outermost and innermost feelers. The signals thus detected can then be separately recorded or can be passed through a suitable mixing circuit to a recording head for recordation on a magnetic tape, wire, or to a photographic or other suitable recorder. The electric signal varying devices have previously been described as comprising linear differential transformers, but obviously any suitable conventional linear potentiometer can be used in place of the differential transformers. In some instances, it may be desirable to measure the actual internal diameter of a well casing. This can equally well be performed by the present embodiment of this invention by a simple reconnection of the electrical circuits of the signal varying devices.

Figure 18 schematically illustrates an electrical system which can conveniently be used for providing the desired record of surface variations as determined by a measuring instrument made in accordance with this embodiment of this invention. As previously described, the measuring instrument should be provided with a large number of feeler fingers, but obviously only one of these feeler fingers will extend at any one time into the maximum pit or cavity and only another will engage the maximum scale of any deposit on the interior surface of a well casing. These two fingers, indicative of the maximum deflection outwardly and inwardly from the normal medial position representative of the normal clean surface of the casing, generally will vary around the circumference of the casing as the traverse progresses, and, therefore, will vary from one feeler to another. For descriptive purposes in explaining the operation of the electrical system, only an instantaneous condition need be considered, and, therefore, only the position of the feeler finger having the maximum outward deflection into a pit and the position of the feeler finger having the maximum inward deflection from a medial position resulting from a contact with the maximum amount of scale and their effects on the electrical circuit need be considered. The effects of signals from other feeler fingers will be explained, but it will be seen that signals from such other fingers will have no effect upon the record of the survey.

In Fig. 18, a well casing 114 is shown with a maximum pit 244 and a maximum scale formation 245. The feeler finger 189 in engagement with the maximum scale deposition 245 is shown mechanically connected through its follower rod 197 to the differential transformer core 233 of the transformer DT1. In this position, this core 233 has been schematically shown as moved upwardly as seen in this figure, so as to provide a greater magnetic linkage between the primary winding 230 and the upper secondary winding 231. This will, therefore, provide a greater magnetic coupling of the primary winding with the secondary winding 232 than with the secondary winding 231. Energization of the primary winding 230 by a suitable source of alternating current, such as an 800 cycle source obtained from a suitable oscillator and batteries contained in compartment 110 of the instrument and connected to supply lines 246, will thus induce a higher voltage in the secondary 232 than in the secondary 231. The differential winding and series connection of the secondaries 231 and 232 will result in a terminal voltage across the secondaries of this differential transformer DT1 which will be directly proportional to the deflection inwardly past the medial point of the feeler finger 189. Normally the signal from the differential transformer DT1 will require amplification. The secondary terminals thereof are, therefore, connected across a step-up transformer 247 which is connected in series with a suitable amplifier 248. The output of the amplifier 248 is again preferably impressed across another transformer 249 which is then connected to a suitable detector circuit. The feeler finger affecting this signal will have the minimum total deflection, that is, it will have the maximum deflection inwardly from the medial position, and its deflection can be represented by the curve in Fig. 18A. The electrical signal from the differential transformer DT1 associated with this minimum deflection feeler, when suitably amplified, may be represented by the curve shown in Fig. 18C, representing the signals at the output terminals of transformer 249. The amplitude of these signals will be directly proportional to the amplitude in the curve in Fig. 18A, and this latter curve may be considered as the envelope of the curve in Fig. 18C.

The feeler finger 189 in engagement with the maximum pit 244 will operate mechanically and electrically in the same general manner as the feeler finger and its related electric circuit in engagement with the maximum scale deposit 245. The principal difference will be that the transformer core 233 of the differential transformer DT2, connected to the feeler in engagement with the maximum pit 244, will be moved in the opposite direction, schematically shown, as downwardly in Fig. 18, and produce a maximum coupling between the transformer primary winding 230 and the transformer secondary winding 231 and a minimum coupling with the transformer secondary winding 232. Obviously, the actual physical movement of the cores, as shown in Figs. 13 and 14, would be opposite to the schematic illustrations. Energization of the primary winding in the same manner as described with reference to transformer DT1 will result in the appearance of an electrical voltage across the secondary terminals of the transformer DT2 substantially 180 electrical degrees out of phase with the voltage appearing across the terminals of the differential transformer DT1. As in the previous instance, the electrical signal from the transformer DT2 preferably is passed through a step-up transformer 250 and an amplifier 251 and is then impressed upon another transformer 252, corresponding to the transformer 249 previously described. The electrical signal at the output terminals of the transformer 252 will be 180° electrically out of phase with the output signal from the transformer 249, and may be represented by the curve shown in Fig. 18D. The envelope of this latter curve will be directly proportional to a curve representing the maximum feeler deflection, that is the maximum deflection of a feeler outwardly past a medial position. The curve in Fig. 18B represents such a maximum feeler deflection corresponding to the passage of the feeler 189 over the maximum pit surface 244.

Each feeler finger is provided with an electrical circuit similar to those illustrated in Fig. 18, so that there is a total of twenty-four circuits similar to the two shown in this figure. In addition, the output of each of the main transformers corresponding to the transformers 249 and 252 are connected to control grid circuits or to other suitable detectors which will act as half-wave rectifiers for passing alternate half-waves of electric signals impressed thereon by the main transformers. These detectors may comprise any suitable electrical apparatus and circuits, and may conveniently be formed by suitable triodes having two plates energized 180 electrical degrees out of phase with an alternating current of the same frequency and phase as that used to energize the differential transformers. This can conveniently be done by connecting a suitable transformer 253 to the source of alternating current 246, and connecting the two plates 254 and 255 of a triode 256 and the two plates 257 and 258 of a triode 259 to opposite terminals of the output of the transformer 253. The control grid 260 of the triode 256 is connected to the output of the minimum deflection main transformer 249 and a grid 261 of the triode 259 is connected to the output of the maximum deflection main transformer 252. Corresponding cathodes 262 and 263 of the triodes 256 and 259 are connected to a common bus 264 and corresponding cathodes 265 and 266 of the triodes 256 and 259 are connected to a second common bus 267. Similar corresponding connections of all the corresponding plates, grids, and cathodes of similar triodes are provided for each electrical circuit connected to each feeler finger. The grids of all of these triodes also are biased to a predetermined grid cutoff in any suitable manner, as by impressing thereon a bias voltage obtained from a grid bias 268 connected to the terminals of the secondaries of the main transformers, which complete the triode grid energizing circuit. This connection of the triodes provides synchronous detectors which produce a half-wave rectification of the signals received by them and impresses such signals upon the two buses 264 and 267.

The curve in Fig. 18E represents the output of the cathode of the minimum deflection feeler circuit connected to the feeler fiinger 189, and the curve in Fig. 18F represents the output of the cathode of the maximum deflection circuit connected to the maximum deflection feeler in engagement with the pit 244. The signal represented by the curve in Fig. 18E comprises the alternate half-wave rectified signal including half-waves a, b, and c of the curve in Fig. 18C, and the signal represented by the curve in Fig. 18F represents the half-wave rectification of the half-waves d, e, and f of the signal represented by the curve in Fig. 18D. Since the signal of the maximum deflection feeler circuit is 180° electrically out of phase with the signal of the minimum deflection feeler circuit, the rectified half-wave output of the synchronous detector triode 259 will be 180° electrically out of phase with the output of the synchronous detector triode 256. Furthermore, since these synchronous detectors are all initially energized by the same source of energization as that which energizes the differential transformers and are suitably biased to a predetermined grid cutoff, no adding of the signals impressed upon the two respective buses 264 and 267 will result, and the only voltage appearing on each of these two buses will be the maximum voltage representative of the maximum deflection of a feeler finger outwardly of a medial position and into a maximum cavity, and the maximum voltage representative of the maximum deflection of a feeler finger inwardly of the medial position and engaging a maximum scale deposit.

If desired, the bus 264 and the bus 267 may be independently connected to two separate recorders so that independent records may be made of the maximum and minimum deflections of the feelers and thus indicate these respective conditions of the inner surface of the well casing by two records. In some instances, it may be desirable to provide a more economical record, and this can conveniently be done by connecting the two buses 264 and 267 to the input of any suitable conventional mixer. Such a connection of these buses is shown in Fig. 18 by connecting the bus 264 to a suitable mixer resistor circuit 269 and connecting the bus 267 to the resistor circuit 270 of a mixer which is then electrically connected to a suitable recording device, such as the exciting coil 271 of a recording head 272 on an electromagnetic recorder. This recorder may comprise any suitable device and may form a record on a suitable magnetic tape or wire 273 or other record. As in most conventional magnetic recorders, a high frequency bias oscillator 274 may be connected to an exciting coil 275 on the recording head 272 to minimize hysteresis effects in the magnetic tape or wire. The electrical result of such an electrical mixer circuit connection is represented by the curve a, d, b, e, c, f in Fig. 18G. This curve includes the rectified half-wave signals represented by the curve in Fig. 18E and the corresponding 180° out of phase rectified half-wave signals represented by the curve in Fig. 18F. This combined mixed signal represents the excitation of the exciting coil 271 of the recording head, and will produce a corresponding record on the recording tape, wire or other record. A similar record will be produced on a photographic recorder or any similar equipment which may be connected to the mixer output.

In this manner, the present embodiment of this invention, provided with an electrical circuit, such as that shown in Fig. 18, will produce separately discernible recorded responses representative of the maximum and minimum deflections of the sensing mechanism representing corresponding variations in the surface undergoing survey. When a record of this type has been made of the complete survey, the measuring instrument may then be removed completely from the well casing and disconnected from its suspension line 111 and taken to any desired convenient place for an analysis of the record. If it is desired to transfer the record any substantial distance from the place where it has been made, the compartmental casing of the measuring instrument may be disassembled, at least to the extent of disconnecting the recorder compartment 6 from its two adjacent compartments 104 and 110, and the record of the survey on the tape, wire, film, or other suitable record, may then be removed from the recorder compartment and shipped to any desired destination. The integrated record, corresponding to the curve shown in Fig. 18G, may then be suitably separated by any conventional electric circuit for separately reproducing electrical signals represented by alternate half-cycles 180° electrically out of phase and analysed to determine the condition of the tube or casing.

In some instances, it may be desirable to provide records of the signals from the maximum and minimum deflection buses which are separately discernibly recorded over a high range of frequencies which may provide more accurate records than are obtainable from an electrical system of the type shown in Fig. 18. Various electric circuits for providing more distinctly separate records may be utilized by simply connecting such circuits between the buses and the recording instrument, in place of the mixer shown in the previously described circuit. Fig. 19 diagrammatically illustrates an electrical circuit capable of providing this improved type of record. In this system, the sensing and detecting mechanism and circuits are substantially the same as those of Fig. 18, and the electrical signals obtainable therefrom and transmitted to the maximum and minimum deflection buses may be represented by the same types of curves as those shown in Figs. 18A to 18F. These same curves are reproduced adjacent to Fig. 19 and are shown in corresponding Figs. 19A through 19F. Similar operating parts and circuits are designated in Fig. 19 with the same reference numerals as those in Fig. 18, and, under the same operating conditions, the outputs of the cathodes of the synchronous detectors to the maximum and minimum deflection buses are shown as half-wave rectified signals 180 electrical degrees out of phase on the two buses 264 and 267.

In this system, the signals from the minimum and maximum deflection buses are passed respectively through suitable low pass filters 276 and 277 adapted to filter out all frequencies above the frequencies to be expected in the intelligence factor representing feeler movements. For example, in many operations the frequency of the intelligence factor (representing feeler movements) in the signal ranges from near zero to something on the order of 100 c.p.s. and the frequency of the signal applied to the differential transformers 229 is 800 c.p.s. Thus, the filters 276 and 277 preferably pass frequencies below 100 c.p.s. and do not pass frequencies significantly above 100 c.p.s.; in particular they do not pass 800 c.p.s.

In the embodiment of Figure 19, after filtration in the filters 276 and 277, the signals containing the intelligence factor representing feeler movements are amplified by any conventional amplifiers 278 and 279. The outputs of these filter amplifying circuits are substantially rectified electrical signals which have the amplitude variations corresponding to the mechanical deflection variations of the feelers which are subjected to the maximum and minimum deflections. These electric signal variations are represented by the curves shown in Figs. 19G and 19H which are substantial duplicates of the curves in Figs. 19A and 19B, respectively. The rectified signal from the minimum deflection circuit amplifier 278 is fed directly to a suitable mixer 280 and the signal from the maximum deflection circuit amplifier 279 is used to frequency modulate a signal in a relatively low frequency oscillator 281 to produce a frequency modulated signal which is then fed to the mixer 280. This provides an exciting signal for a suitable recording circuit which may utilize an exciting current, which varies from zero to about 480 to 600 cycles.

As shown, the mixed signal from the mixer is used to energize any suitable recorder exciting winding 271, which may be the winding of a recorder head for a magnetic tape or wire recorder adapted to impress a suitable record signal on a magnetic tape or wire 273. As in the previously described arrangement, a suitable high frequency bias oscillator 274 may be connected to a high frequency exciting winding 275 on the recorder head 272 for overcoming hysteresis of the recording wire or tape and to obtain greater linearity in the recorded signal. This latter feature is conventional in many types of recorders. This system for recording separately discernible records also avoids a disadvantage which may occur under certain conditions with the system shown in Fig. 18 if the measuring instrument is moved too slowly in its traverse of the well casing. It has been found that if the measuring instrument is withdrawn from the well casing at a relatively slow rate, the recorder may be driven too slowly to provide a truly accurate record of the deflections of the sensing equipment. This is due to the fact that if the two recording signals are placed on a single channel wire or tape, the record of these signals may be greatly attenuated when the recorder is operated at relatively low speeds, especially where the pass band for the signals from the feeler deflection systems on the maximum and minimum deflection buses will normally be from 0–80 cycles. A system such as that shown in Fig. 19, therefore, possesses a number of advantages over the more simple system of Fig. 18, and may be preferred where more accurate records are desired.

In many instances, it may be desirable to obtain a record of the actual maximum and minimum variations in the diameter of the well tube or casing. This can be obtained with the present embodiment of this invention, utilizing either of the electrical systems of Figs. 18 or 19, with a slight reconnection of the linear differential transformers in these systems to the amplifying circuits, and may be readily done by the use of a simple switch connected to the output terminals of the differential transformers and to the first set of step-up transformers. Fig. 20 shows such a reconnection through a switch 20' for obtaining a measurement of the maximum and minimum diameters of a well casing with an instrument of this type. In this arrangement, the differential transformers of diametrically opposite feeler fingers 189 are connected so that the signals thereof will be additive when the deflections of the respective associated feelers are both in the same direction from a predetermined medial position. In Fig. 20, two such diametrically opposite differential transformers 282 and 283 are shown in which the output of the secondary 232 of the differential transformer 282 is connected in series with the output terminal of the secondary 231 of the differential transformer 283, while the output terminal of the secondary 232 of the differential transformer 283 is connected to the terminal of the step-up transformer 284 previously connected to the corresponding terminal of the secondary 232 of the differential transformer 282. Since the primaries 230 of the diametrically opposite transformers 282 and 283 are energized by the same source of alternating current, the electrical signals induced in the secondaries of these two transformers will have the same frequency, although if the feeler of one of these, such as the feeler 189 associated with the differential transformer 282, engages a cavity or pit 244 in the casing 114, while the feeler 189 associated with the differential transformer 283 engages scale 245 on the interior of the casing 114, the electrical signals at the terminals of the differential transformers 282 and 283 will be 180° electrically out of phase. A series connection of the secondaries of these diametrically opposite transformers in the manner shown in Fig. 20 will result in an output between the two transformers which is the difference between these two out of phase electrical signals. At times, this may not give a true representation of the actual condition of the interior of the well casing, as if the feeler associated with the transformer 282 is in a pit 244, as shown in Fig. 20, and the feeler associated with the transformer 283 simultaneously engages a scale deposit 245, the difference between the electrical signals of the series connected transformers 282 and 283, will only indicate a difference in the diameter of the casing from the normal diameter equal to the difference between the outward deflection past the medial position of the transformer 282 feeler and the inward deflection past the medial position of the transformer 283 feeler. This condition, however, will probably occur only very rarely in actual practice, so that, generally, the signal obtained from such a series connection of the differential transformers will give a fairly accurate indication of the diameter of the casing and also of the surface irregularities which cause the variations in the casing diameter.

In completing the circuit, the output of each pair of series connected diametrically opposite transformers is connected to a step-up transformer 284. This transformer is connected to a suitable amplifier 285, and these parts of the circuit may comprise the same step-up transformers and amplifiers which are connected directly to each differential transformer in the circuits of Figs. 18 and 19. Obviously, only half of the step-up transformers and their respective amplifiers are utilized when the differential transformers are serially connected as in Fig. 20 for determining well casing diameters.

With this system of connection the instantaneous maximum diameter will give an electrical signal which is 180° electrically out of phase with the instantaneous minimum diameter in the same manner as the respective maximum outwardly deflected feelers and the inwardly deflected feelers will give such out of phase signals in the systems of Figs. 18 and 19. These maximum and minimum diameter out of phase signals will appear on the maximum and minimum deflection buses 267 and 264 in the same manner as the maximum and minimum deflection signals will appear on these buses in the systems of Figs. 18 and 19. The recording of these two sets of signals and their analyses can then be made in the same manner as with the records obtainable by the systems shown in these two system diagrams.

For purposes of illustration, a magnetic wire recorder, of the type which may be used with any of the electrical systems suitable to this invention, is shown in Figs. 16 and 17. In this instance the mechanical drive for the magnetic recorder is provided by the drive shaft 188 which is driven by the magnet 187 of the magnetic clutch and power is transmitted through suitable gearing 286 to the main drive shaft 287 of the magnetic recorder. This drive shaft is adapted to provide a regulated drive of a magnetic recording tape or wire from a supply reel 288 past the magnetic recording head 272, with its exciting windings 271, and over suitable position and tension regulating spools 289 and 290 to a take-up reel 291. The electrical connections from the batteries to the various electrical circuits including the step-up transformers, differential transformers, and the recorder are only generally indicated by lines 292 and 293, it being understood that the proper number, spacing, and insulation of the various electrical conductors is provided within the various compartments, and that provision is made through suitable sealing bushings for passage from one sealed compartment to another as may be required. Details of this wiring are not illustrated, as these may take any suitable conventional forms as may be required to provide the necessary electrical circuits.

While particular embodiments of this invention have been illustrated and described, modifications thereof will occur to those skilled in the art. It is to be understood, therefore, that this invention is not to be limited to the particular arrangements disclosed, and it is intended in the appended claims to cover all modifications within the spirit and scope of this invention.

We claim:

1. In a calipering device including a plurality of feelers adapted to be activated by the surface to be calipered, the combination of a source of an alternating signal, at least two differential transformers, each comprising a primary coil connected to said source, a secondary coil, and a movable core therefor, linkage means connected to move each of said cores with respect to corresponding coils in response to at least one of said feelers, a bus-line, a rectifier connected to conduct from each secondary coil to said bus-line, and means for recording variations in the potential of said bus-line.

2. In a calipering device including a plurality of feelers, the combination of a source of an alternating signal, a plurality of variable coupling transformers each with a primary and a secondary coil, said primary coils being connected to said source of alternating signal, means for varying the coupling of the primary and secondary coils of each transformer in response to the movements of at least one of said feelers, a bus-line, a plurality of rectifiers, one being connected between the secondary coil of each of said transformers and said bus-line, all of said rectifiers being adapted to conduct in the same direction, and means for recording potential variations of said bus-line.

3. In a measuring instrument including a plurality of feelers, the combination of a plurality of variable coupling transformers each with a primary coil and a secondary coil, said primary coils being connected to a source of alternating current, means for varying the coupling of the primary and secondary coils of each transformer in accordance with the positions of a separate one of said feelers, for obtaining corresponding variations in signals from said transformers, means for detecting and passing only the maximum signals at any instant from said transformers, and means for recording signals passed by said detecting means.

4. In a measuring instrument for determining dimensions and surface variations of a member and having a plurality of feelers adapted to make sliding contact with the surface of said member and to move inwardly and outwardly in response to surface variations thereof, the combination of a plurality of differential transformers, means responsive to the position of each of said feelers outwardly or inwardly of a medial position for varying signals of a separate one of said differential transformers, means for passing only signals from said transformers indicative of the position of the outermost of said feelers, means for passing only signals from said transformers indicative of the position of the innermost of said feelers, and means for separately discernibly recording signals from both of said signal passing means.

5. In a calipering device including a body and a plurality of feelers radially movable thereon, the combination of a source of electrical signals, a plurality of electric signal varying devices, means for operating said electric signal varying devices to provide signals in accordance with the positions of said feelers indicative of the respective positions thereof, a pair of bus-lines, means for passing to one of said bus-lines electric signals indicative of the positions outwardly of said feelers past a medial position, means for passing to the second of said bus-lines electric signals indicative of the positions inwardly of said feelers past said medial position, and means for separately discernibly recording only the maximum signals at any instant from both of said bus-lines.

6. In a measuring instrument for determining dimensions and surface variations of a body and having a plurality of feelers adapted to make sliding contact with the surface of said body and to move inwardly and outwardly in response to surface variations thereof, the combination of a plurality of differential transformers, means responsive to the position of each of said feelers outwardly or inwardly of a medial position for varying the signals of a separate one of said differential transformers, two electrical detecting systems, one of said detecting systems passing at any instant only the signal responsive to the innermost feeler and the other of said detecting systems passing at any instant only the signal responsive to the outermost feeler, and means for separately discernibly recording signals from each of said detecting systems.

7. In a calipering device including a body and a plurality of feelers pivotally mounted and radially movable thereon, the combination of a source of electrical signals, a plurality of electric signal varying devices, means for operating said electric signal varying devices to provide signals in accordance with the positions of said feelers indicative of the respective positions thereof, a pair of bus-lines, means for passing to one of said bus-lines electric signals indicative of the positions outwardly of said feelers past a medial position, means for passing to the second of said bus-lines electric signals indicative of the positions inwardly of said feelers past said medial position, and single means for separately discernibly recording the maximum signals from both of said bus-lines whereby the separately discernible recorded signals indicate only the innermost and outermost positions of said feelers at any instant.

8. In a measuring instrument for determining dimensions and surface variations of a body and having a plurality of feelers adapted to make sliding contact with the surface of said body and to move inwardly and outwardly in response to surface variations thereof, the combination of two electrical detecting systems, one of said detecting systems being responsive to the position of the innermost feeler and the other of said detecting systems being responsive to the position of the outermost feeler, means for frequency modulating the output of one of said detecting systems, means for mixing the output of the other of said two detecting systems and said frequency modulated output providing two separately discernible signals, means for recording said separately discernible signals, and means for operating said recording means in accordance with movement of said feelers over the surface of the body.

9. In a measuring instrument for determining dimensions and surface variations of a cylindrical member and having a plurality of diametrical pairs of feelers, feelers of each pair being adapted to make sliding contact with diametrically opposite surfaces of said cylindrical member and to move radially inwardly and outwardly in response to surface variations in said surfaces thereof, the combination of two electrical detecting systems, one of said detecting systems being responsive to the distance between the pair of feelers the minimum distance apart and the other of said detecting systems being responsive to the distance between the pair of feelers the maximum distance apart, and means for separately discernibly recording responses from each of said detecting systems.

10. In a measuring instrument including a body and a plurality of diametrical pairs of feelers radially movable on said body adapted to engage diametrically opposite surfaces of a cylindrical member, the combination of a source of electric signals, a plurality of electrical signal varying devices, means for operating said electric signal varying devices to provide signals responsive to the distance between the feelers of each pair thereof, a pair of bus-lines, means for passing to one of said bus-lines electric signals indicative of the maximum distance apart of said feelers of any pair, means for passing to the second of said bus-lines electric signals indicative of the minimum distance apart of said feelers of any pair, and means for recording the signals from both of said bus-lines.

11. In a calipering device including a plurality of diametrical pairs of feelers adapted to be activated by the surface to be calipered, the combination of a plurality of differential transformers, each transformer comprising primary and secondary coils and a movable core therefor, linkage means connected to position each of said cores with respect to associated coils in accordance with the position of one of said feelers, recording means, and rectifier means connected to conduct additive signals from each pair of transformers linked to a diametrical pair of feelers to said recording means for recording variations in the signals therefrom to indicate variations in the maximum and minimum diameter between diametrical pairs of said feelers.

12. In a measuring instrument including a body and a plurality of diametrical pairs of feelers radially movable on said body adapted to engage diametrically opposite surfaces of a cylindrical member, the combination of a plurality of variable electrical signal sources, means for varying signals from said sources responsive to the positions of said feelers and indicative of the distance apart of each respective pair of feelers, a pair of bus-lines, means for passing to one of said bus-lines electric signals indicative of the maximum distance apart of any pair of said feelers, means for passing to the second of said bus-lines electric signals indicative of the minimum distance apart of any pair of said feelers, and means for separately discernibly recording the signals from both of said bus-lines.

13. In a calipering device for determining dimensions and surface variations of a member and including a plurality of feelers, the combination of a plurality of sources of variable electrical signals, means for varying signals from said sources in accordance with the positions of said feelers, a pair of bus-lines, means for impressing on one of said bus-line signals indicative of the positions of all of said feelers extending outwardly past a medial position, means for impressing on the other of said bus-lines signals 180° electrically out of phase with said outward position signals and indicative of the positions of all of said feelers extending inwardly past said medial position, recording means, means for operating said recording means in accordance with movement of said feelers over the surface of the member being calipered, and means for impressing on said recording means separately discernible maximum signals on both of said bus-lines indicative of the positions of the outermost and innermost feelers at the respective positions of said feelers during their movement relative to said member.

14. In a calipering device for determining dimensions and surface variations of a member and including a plurality of feelers, the combination of a plurality of sources of variable electrical signals, means for varying signals from said sources in accordance with the positions of said feelers, a pair of bus-lines, means for impressing on one of said bus-lines signals indicative of the outermost position of any of said feelers past a medial position, means for impressing on the other of said bus-lines signals 180° electrically out of phase with said outermost position signals and indicative of the innermost positions of any of said feelers past said medial position, recording means, means for operating said recording means in accordance with movement of said feelers over the surface of the member being calipered, and means for impressing on said recording means separately discernible maximum signals from both of said bus-lines indicative of the positions of the outermost and innermost feelers at the respective positions of said feelers during their movement relative to said member.

15. In a measuring instrument for determining dimensions and surface variations of a member and including a plurality of feelers, the combination of a plurality of sources of variable alternating current electric signals, means for varying signals from each of said sources in accordance with the respective position of a separate one of said feelers, a pair of bus-lines, means for impressing on synchronous detectors signals indicative of the positions of all of said feelers extending outwardly past a medial position, means for impressing on said synchronous detectors signals 180° electrically out of phase with said outward position signals and indicative of the positions of all of said feelers extending inwardly past said medial position, means for passing alternate half cycles of maximum outward position signals impressed on said synchronous detectors, means for passing alternate half cycles of maximum inward position signals on said synchronous detectors 180° electrically out of phase with said outward position half cycle signals, recording means, means for operating said recording means in accordance with movement of said feelers over the surface of said member, and means for impressing on said recording means both of said maximum signals indicative of the outermost and innermost feelers at the respective positions of said feelers during their movement relative to said member.

16. In a measuring instrument for indicating dimensions and surface variations of a member, a plurality of variable electric signal devices, a cylindrical compartment for housing said instrument having a plurality of circumferentially spaced feeler windows in the sides thereof, a plurality of feeler fingers having surface contact tips adjacent to an end thereof adapted to be activated by the surface of the member to be measured and being bifurcated into two prongs at the other end thereof, each of said feeler contact tips being aligned with one of said feeler windows and being adapted to extend therethrough, a transverse wall extending across said compartment having an annular groove therein centered axially of said compartment, said bifurcated ends of said feeler fingers being arranged substantially in a ring circumferentially adjacent one another with one of said prongs of each finger rockably seated in said annular groove and the other of said prongs being formed with a hooked end extending outwardly therefrom as a bellcrank, means including a plurality of follower elements for varying the electric signals obtainable from said variable signal devices responsive to activation of said feeler fingers, each of said follower elements respectively operably engaging a separate one of said feeler prong hooked ends, resilient means biasing each of said follower elements in a direction axially away from said feeler fingers and through engagement of said follower with one of said feeler fingers biasing said one of said prongs of said one feeler finger into said groove and said contact tips radially of said compartment outwardly through said windows, a latching cap member adapted to extend over and to engage the contact tip ends of said feeler fingers for holding said contact tips latched retracted within said compartment, and means for releasing said latching cap member to permit said contact tips to project outwardly through said windows.

17. In a measuring instrument for determining dimensions and surface variations of a member, a plurality of electric signal varying devices, a closed compartment containing said signal varying devices, a cylindrical second compartment extending from said closed compartment, a closure wall between said compartments having an annular collar with an annular groove therein centered axially of said second compartment, a plurality of circumferentially spaced feeler windows in said second compartment, a plurality of feeler fingers having surface contact contact tips adjacent to an end thereof adapted to be activated by the surface to be measured and being bifurcated into two prongs at the other end thereof, each of said feeler contact tips being aligned with one of said feeler windows and being adapted to extend therethrough, said bifurcated ends of said feeler fingers being arranged in a circumferentially adjacent cluster with one of said prongs of each finger rockably seated in said annular groove and the other of said prongs being formed with a hooked end extending outwardly therefrom, means including a plurality of follower elements extending into said closed compartment for varying the electric signals obtainable from said signal varying devices in response to activation of said feelers, each of said follower elements extending into said second compartment and respectively operably engaging one of said feeler prong hooked ends, resilient means biasing said follower elements in a direction axially away from said feeler fingers and exerting a force on said feeler fingers through engagement thereof with said follower elements biasing said one prong into said groove and said contact tips radially outwardly through said windows, a latching member adapted to engage the contact tip ends of said fingers for holding said contact tips latched retracted within said second compartment, and means for releasing said latching member to permit said feeler contact tips to project outwardly through said windows.

18. In a measuring instrument for determining dimensions and surface variations of a member, the combination comprising a housing, a plurality of feeler fingers carried by said housing and adapted to making sliding contact with the surface of said member and to move inward and outward in response to variations therein, resilient means normally urging said feeler fingers into an active position in engagement with the surface of said member; a plurality of sources of variable electric signals, means for varying the signals of said sources in accordance with the positions of said feeler fingers, means for recording signals from said sources, an axially movable latch member adapted to engage and latch said feeler fingers in said housing, drive means for operating said recording means in accordance with movement of said feeler fingers over said body surface on release responsive to predetermined conditions, and means including a releaseable drive operable by said recording means drive for disengaging said latch member to permit said feeler fingers to move into engagement with the surface of said body being measured.

References Cited in the file of this patent

UNITED STATES PATENTS

| | | |
|---|---|---|
| 2,614,164 | Houston | Oct. 14, 1952 |
| 2,640,275 | Boucher | June 2, 1953 |
| 2,695,456 | Roberts | Nov. 30, 1954 |
| 2,721,110 | Price | Oct. 18, 1955 |
| 2,799,946 | Mayes | July 23, 1957 |